United States Patent
Khan et al.

(10) Patent No.: US 10,694,375 B2
(45) Date of Patent: Jun. 23, 2020

(54) SUPPORTING A VERSIONING OF PARAMETERS

(71) Applicant: HERE GLOBAL B.V., Eindhoven (NL)

(72) Inventors: Muhammad Irshan Khan, Tampere (FI); Jari Syrjärinne, Tampere (FI); Pavel Ivanov, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 16/597,315

(22) Filed: Oct. 9, 2019

(65) Prior Publication Data
US 2020/0045539 A1 Feb. 6, 2020

Related U.S. Application Data

(62) Division of application No. 15/738,466, filed as application No. PCT/EP2015/064633 on Jun. 29, 2015, now Pat. No. 10,477,392.

(51) Int. Cl.
*H04W 24/00* (2009.01)
*H04W 12/04* (2009.01)
(Continued)

(52) U.S. Cl.
CPC ............ *H04W 12/04* (2013.01); *G01S 5/02* (2013.01); *H04L 9/0833* (2013.01);
(Continued)

(58) Field of Classification Search
USPC ........ 342/257.3; 340/539.13; 455/456.5, 406
See application file for complete search history.

(56) References Cited

U.S. PATENT DOCUMENTS 5,577,122 A * 11/1996 Schipper .................. G01S 19/07
342/357.31
7,538,666 B2 * 5/2009 Campman ............ G07C 9/00111
340/539.13
(Continued)

FOREIGN PATENT DOCUMENTS

WO WO-2015153489 A1 * 10/2015

OTHER PUBLICATIONS

"Advanced Encryption Standard (AES)" Federal Information Processing Standards Publication 197 Publication date: Nov. 26, 2001, 51 pages.
(Continued)

*Primary Examiner* — David Q Nguyen
(74) *Attorney, Agent, or Firm* — Alston & Bird LLP

(57) ABSTRACT

An apparatus assembles positioning assistance data using a predetermined version of a set of values of parameters. The positioning assistance data relates to radio signals of a particular positioning support device. The apparatus encrypts the positioning assistance data using an encryption key that is associated with this version and causes the particular positioning support device to transmit the assembled and encrypted data. The positioning support device transmits the data. An apparatus obtains the data, received by a mobile device, and attempts to decrypt the data using at least one encryption key. If the decryption is successful with a particular encryption key, a version of a set of values of parameters may be selected that is associated with the encryption key.

20 Claims, 11 Drawing Sheets

(51) Int. Cl.
    *H04L 29/06*     (2006.01)
    *H04W 4/02*     (2018.01)
    *H04W 12/02*     (2009.01)
    *G01S 5/02*     (2010.01)
    *H04L 9/08*     (2006.01)
    *H04L 9/06*     (2006.01)
    *H04W 64/00*     (2009.01)

(52) U.S. Cl.
    CPC ........ *H04L 9/0861* (2013.01); *H04L 63/0428* (2013.01); *H04W 4/025* (2013.01); *H04W 12/02* (2013.01); *H04L 9/0631* (2013.01); *H04W 64/003* (2013.01)

(56) References Cited

U.S. PATENT DOCUMENTS

| | | | |
|---|---|---|---|
| 9,059,974 | B2 | 6/2015 | Kim et al. |
| 9,686,679 | B2 * | 6/2017 | Qin ................. H04W 12/12 |
| 2002/0029335 | A1 | 3/2002 | Crockett et al. |
| 2008/0161011 | A1 | 7/2008 | Babin et al. |
| 2010/0259450 | A1 | 10/2010 | Kainulainen et al. |
| 2013/0165157 | A1 * | 6/2013 | Mapes ................. H04W 4/029 455/456.5 |
| 2014/0046908 | A1 | 2/2014 | Patiejunas et al. |
| 2015/0140962 | A1 * | 5/2015 | Mapes ................. H04W 4/029 455/406 |
| 2016/0161592 | A1 | 6/2016 | Wirola et al. |

OTHER PUBLICATIONS

"Specification of the Bluetooth System, Covered Care Package version 4.2." Bluetooth SIG. vol. 1, Part A, Architecture, chapter 1.2; vol. 1, Part A, Architecture, chapter 3.3.2.2; vol. 6, Part B, Link Layer Specification, chapters 2.1-2.3. Retrieved from the Internet: <URL: https://www.bluetooth.com/specifications/bluetooth-core-specification> (Dec. 2, 2014). pp. 16-17, 38-42, 54-55.
International Search Report and Written Opinion of International Searching Authority for International Patent Application No. PCT/EP2015/064633 dated Mar. 15, 2016, 17 pages.
Notice of Allowance for U.S. Appl. No. 15/738,466 dated Apr. 3, 2019.
Notice of Allowance for U.S. Appl. No. 15/738,466 dated Jul. 3, 2019.
Office Action for European Application No. 15 735 883.9 dated May 17, 2019, 5 pages.
Office Action for U.S. Appl. No. 15/738,466 dated Nov. 20, 2018.

* cited by examiner

| Field | Bytes | |
|---|---|---|
| Preamble | 1 | Un-encrypted data |
| MAC address | 6 | |
| CRC calculated using whole packet (encrypted and unencrypted data) | 1 | |
| CRC (data to be encrypted) | 1 | |
| Image offset | 3 | |
| Image size | 2 | |
| Page id | 4bits | |
| Battery information | 4 bits | |
| Time stamp | | |
| Origin-Latitude | 4 | Encrypted data |
| Origin-Longitude | 4 | |
| Origin-Floor-ID | 1 | |
| DC Component | 1 | |
| AC Components | 6 | |

FIG. 9

SUPPORTING A VERSIONING OF PARAMETERS

CROSS-REFERENCE TO RELATED APPLICATIONS

This application is a divisional of U.S. application Ser. No. 15/738,466, filed Dec. 20, 2017, which is a national phase entry of International Application No. PCT/EP2015/064633, filed Jun. 29, 2015, the entire contents of which are incorporated herein by reference.

FIELD OF THE DISCLOSURE

The invention relates to the field of positioning and more specifically to the support of a versioning of a set of parameters that is used for generating positioning assistance data.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

For a first aspect of the invention, an example embodiment of a method comprises, performed by at least one apparatus, extracting from radio signals, transmitted by a positioning support device and received by a mobile device, data enabling a determination of characteristics of radio signals transmitted by the positioning support device, the characteristics expected to be observable at different locations, wherein the data is at least partially encrypted using an encryption key that is associated with a particular version of a set of values of parameters that was used in assembling the data. The method further comprises attempting to decrypt the at least partially encrypted data using at least one encryption key that is accessible to the apparatus. The method further comprises determining whether the decryption with a used encryption key was successful. The method further comprises selecting a version of a set of values of parameters that is associated with the encryption key, if it is determined that the decryption was successful.

For a second aspect of the invention, an example embodiment of a method comprises, performed by at least one apparatus, obtaining characteristics of radio signals, the radio signals transmitted by a positioning support device and the characteristics of radio signals measured by at least one mobile device at each of a plurality of locations and obtaining indications of the locations of measurement. The method further comprises making use of a predetermined version of a set of values of parameters for assembling, based on the obtained characteristics of radio signals and the obtained indications of the locations of measurement, data enabling a determination of characteristics of radio signals transmitted by the positioning support device, the characteristics expected to be observable at different locations. The method further comprises encrypting the assembled data at least partially using an encryption key that is associated with the predetermined version of the used set of values of parameters. The method further comprises causing the positioning support device to store the at least partially encrypted data as a basis for a repeated and automatic transmission of the data by the positioning support device to enable mobile devices receiving the data to determine their positions.

For a third aspect of the invention, an example embodiment of a method comprises holding available, at a positioning support device, stored data which enables a determination of characteristics of radio signals transmitted by the positioning support device, the characteristics being expected to be observable at different locations, wherein the stored data has been at least partially encrypted using an encryption key that is associated with a particular version of a set of values of parameters used for assembling the data. The method further comprises automatically and repeatedly transmitting, by the positioning support device, the stored data to enable mobile devices receiving the data and having access to the encryption key and the particular version of the set of values of parameters to determine their position based on the data.

An example embodiment of a first apparatus for each aspect of the invention comprises means for performing the actions of any embodiment of the example method presented for the first aspect or the second aspect or the third aspect.

The means of the first apparatus for each aspect of the invention may be implemented in hardware and/or software. They may comprise for instance a processor for executing computer program code for realizing the required functions, a memory storing the program code, or both. Alternatively, they may comprise for instance a circuit that is designed to realize the required functions, for instance implemented in a chipset or a chip, like an integrated circuit. For the third aspect, the means may comprise in addition a memory storing data and/or a transmitter.

An example embodiment of a second apparatus for the first aspect or the second aspect of the invention comprises at least one processor and at least one memory including computer program code, the at least one memory and the computer program code configured to, with the at least one processor, cause the apparatus at least to perform the actions of any embodiment of the example method presented for the first aspect or the second aspect.

An example embodiment of a second apparatus for the third aspect of the invention comprises at least one processor and at least one memory. The at least one memory includes computer program code and data enabling a determination of characteristics of radio signals transmitted by a positioning support device, the characteristics being expected to be observable at different locations, wherein the stored data has been at least partially encrypted using an encryption key that is associated with a particular version of a set of values of parameters used for assembling the data. The at least one memory and the computer program code are configured to, with the at least one processor, cause the positioning support device at least to perform the actions of any embodiment of the example method presented for the third aspect.

Any of the described apparatuses may comprise only the indicated components or one or more additional components.

Moreover an example embodiment of a system is presented, which comprises a plurality of any presented example embodiment of any apparatus of the third aspect. Optionally, the system may comprise in addition any presented example embodiment of any apparatus of the first aspect and/or any presented example embodiment of any apparatus of the second aspect.

Moreover an example embodiment of a non-transitory computer readable storage medium, in which computer program code is stored, is presented for the first, second and third aspect of the invention. The computer program code causes an apparatus to perform the actions of any embodiment of the example method presented for the first aspect or the second aspect or the third aspect when executed by a processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that any embodiment of the computer program code by itself has to be considered an example embodiment of the invention according to the second aspect or the third aspect, respectively, as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for supporting a versioning of parameters. In certain embodiment, any of the presented apparatuses is an apparatus for supporting a versioning of parameters.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 9 is a table illustrating example details of the operations of FIG. 8;

DETAILED DESCRIPTION OF THE FIGURES

Figure 1:
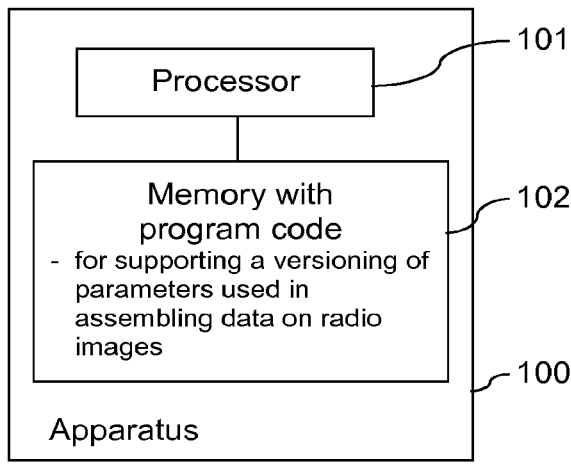
FIG. 1 is a schematic block diagram of an example embodiment of an example embodiment of an apparatus according to the first or second aspect.

FIG. 1 is a schematic block diagram of an example embodiment of an apparatus 100 according to the first or second aspect of the invention. Apparatus 100 comprises a processor 101 and, linked to processor 101, a memory 102. Memory 102 stores computer program code for supporting a versioning of parameters used in assembling data on radio images in line with the first and second aspect of the invention, respectively. Processor 101 is configured to execute computer program code stored in memory 102 in order to cause an apparatus to perform desired actions.

For the first aspect, apparatus 100 may be a mobile device, like a mobile communication device or an Internet-of-Things (IoT) device. A mobile device is configured to enable operation while the device is moving. For the second aspect, apparatus 100 may be a mobile device, like a mobile communication device, or a stationary device, like a server. A stationary device is configured to be stationary when in operation and/or fixed to a particular location. A stationary device may be ground based and thus stationary with respect to Earth or only stationary within a particular environment, like a ship. Apparatus 100 may equally be a module, like a chip, circuitry on a chip or a plug-in board, for a device. Optionally, apparatus 100 may comprise various other components, like a data interface, a user interface, a further memory, a further processor, etc.

An example operation of apparatus 100 will now be described with reference to the flow chart of FIG. 2. The operation is an example embodiment of a method according to the first aspect of the invention. Processor 101 and the program code stored in memory 102 cause an apparatus to perform the operation when program code according to the first aspect of the invention is retrieved from memory 102 and executed by processor 101. The apparatus that is caused to perform the operation may be apparatus 100 or some other apparatus, for example but not necessarily a mobile device comprising apparatus 100.

The apparatus extracts from radio signals, transmitted by a positioning support device and received by a mobile device, data enabling a determination of characteristics of radio signals transmitted by the positioning support device, the characteristics expected to be observable at different locations, wherein the data is at least partially encrypted using an encryption key that is associated with a particular version of a set of values of parameters that was used in assembling the data. (action 111) The indication that the extracted data is at least partially encrypted using an encryption key means that the extracted data may have been encrypted entirely with the encryption key or that a part of the extracted data may have been encrypted with the encryption key while another part of the extracted data may not have been encrypted with the encryption key.

The apparatus furthermore attempts to decrypt the at least partially encrypted data using at least one encryption key that is accessible to the apparatus. (action 112) The at least one encryption key may be accessible to the apparatus by being stored in the apparatus or in a device comprising the apparatus.

The apparatus furthermore determines whether the decryption with a used encryption key was successful. (action 113)

The apparatus furthermore selects a version of a set of values of parameters that is associated with the encryption key, if it is determined that the decryption was successful. (action 114)

Another example operation of apparatus 100 will now be described with reference to the flow chart of FIG. 3. The operation is an example embodiment of a method according to the second aspect of the invention. Processor 101 and the program code stored in memory 102 cause an apparatus to perform the operation when program code according to the second aspect of the invention is retrieved from memory 102 and executed by processor 101. The apparatus that is caused to perform the operation may be apparatus 100 or some other apparatus, for example but not necessarily a device comprising apparatus 100.

The apparatus obtains characteristics of radio signals, the radio signals transmitted by a positioning support device and the characteristics of radio signals measured by at least one mobile device at each of a plurality of locations. The apparatus also obtains indications of the locations of measurement. (action 121) The mobile device may be the apparatus, a mobile device comprising the apparatus, or a mobile device that is separate from the apparatus.

The apparatus furthermore makes use of a predetermined version of a set of values of parameters for assembling, based on the obtained characteristics of radio signals and the obtained indications of the locations of measurement, data enabling a determination of characteristics of radio signals transmitted by the positioning support device, the characteristics expected to be observable at different locations. (action 122) The predetermined version may be for instance the only version or the most recent version.

The apparatus furthermore encrypts the assembled data at least partially using an encryption key that is associated with the predetermined version of the used set of values of parameters. (action 123)

The apparatus furthermore causes the positioning support device to store the at least partially encrypted data as a basis for a repeated and automatic transmission of the data by the positioning support device to enable mobile devices receiving the data to determine their positions. (action 124)

It is to be understood that each of actions 121 to 124 may be performed for each of a plurality of positioning support devices.

It is further to be understood that in some example embodiments, apparatus 100 of FIG. 1 may be an apparatus according to the second and third aspect of the invention and thus be configured to support an embodiment of the method according to the first aspect of the invention and as well an embodiment of the method according to the second aspect of the invention.

Figure 4:
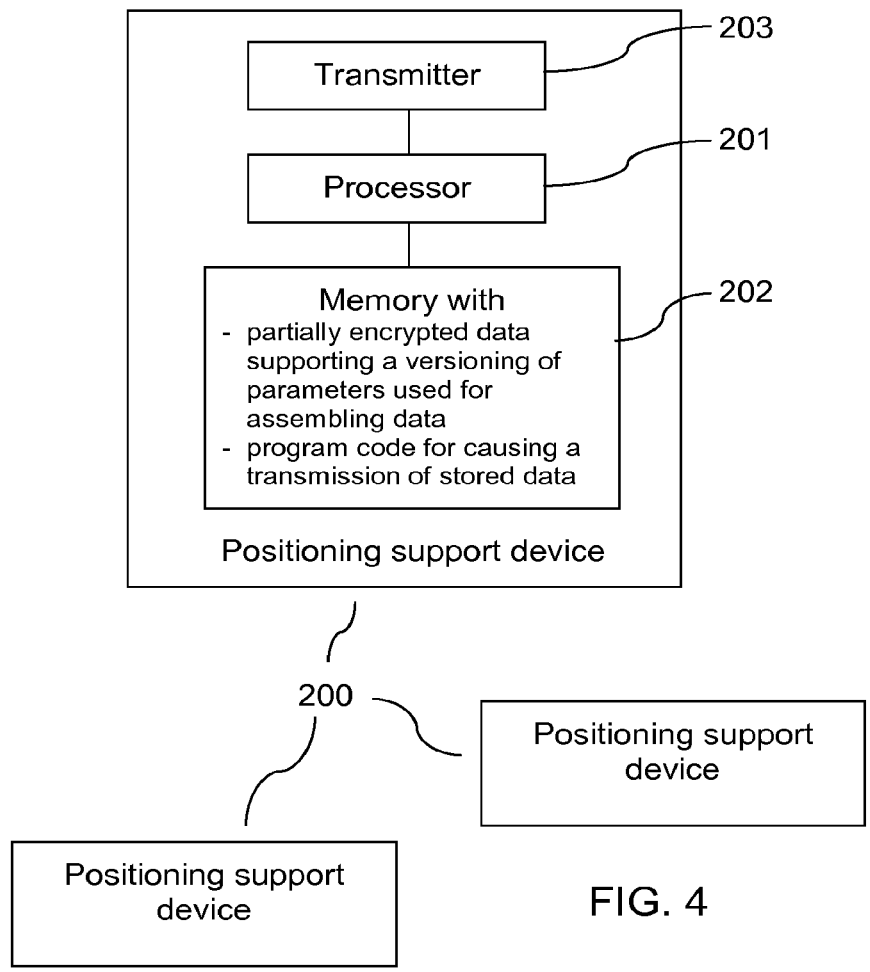
FIG. 4 is a schematic block diagram of an example embodiment of a system comprising an example embodiment of an apparatus according to the third aspect.

FIG. 4 is a schematic block diagram of an example embodiment of a system according to the invention. The system comprises a plurality of positioning support devices 200. Each positioning support device 200 is an example embodiment of an apparatus according to the third aspect of the invention. Each positioning support device comprises a processor 201 and, linked to processor 201, a memory 202 and a transmitter 203. Memory 202 stores at least partially encrypted data which supports a versioning of parameters used for assembling the data and computer program code for causing a transmission of the stored data. It is to be understood that data and program code may also be distributed to a plurality of memories 202 of positioning support device 200. Processor 201 is configured to execute computer program code stored in memory 202 in order to cause positioning support device 200 to perform desired actions.

Each of the positioning support devices 200 may be a stationary device. Any of positioning support devices 200 may equally be a module, like a chip or circuitry on a chip, for a stationary device. Optionally, any of the positioning support devices 100 may comprise various other components, like a data interface, a user interface, a further memory, a further processor, etc.

An example operation of the system of FIG. 4 will now be described with reference to the flow chart of FIG. 5. The operation is an example embodiment of a method according to the third aspect of the invention.

Positioning support device 200 holds available stored data which enables a determination of characteristics of radio signals transmitted by the positioning support device, the characteristics being expected to be observable at different locations. The stored data has been at least partially encrypted using an encryption key that is associated with a particular version of the set of values of parameters used for assembling the data. (action 211)

Positioning support device 200 furthermore automatically and repeatedly transmits the stored data to enable mobile devices receiving the data and having access to the encryption key and the particular version of the set of values of parameters to determine their position based on the data. (action 212) Transmitting stored data automatically may be understood such that the data is transmitted autonomously by the positioning support device 200, that is, without trigger by an external server for each of the repeated transmissions. Processor 201 and the program code stored in memory 202 of positioning support device 200 may cause the positioning support device 200 to perform this action when program code is retrieved from memory 202 and executed by processor 201. The stored data may be transmitted via transmitter 203.

The same actions may be performed by each of the plurality of positioning support devices 200 of the system of FIG. 4 to enable mobile devices to determine their own positions more precisely and at various locations.

Conventional systems that enable a mobile device to determine its own position based on location dependent characteristics of radio signals of different transmitters require an Internet connection to download data on the characteristics of radio signals from the backend of a service provider. Some mobile devices may not be equipped with a cell modem or a WLAN modem that would enable them to access the Internet, though. A manual transfer of the data using a wired link instead may be troublesome and limited to few locations. Also for mobile device that are principally able to wirelessly access the Internet, availability of the Internet may not be given whenever the data is be needed. Furthermore, some devices may have a very small memory that is unable to store a large amount of positioning assistance data, like data for an entire region or data for an entire building. Such devices may include IoT devices, like smart watches, smart bands, etc.

Certain embodiments of the first aspect of the invention therefore provide that an apparatus obtains data that is provided by a positioning support device and that defines an association of observable characteristics of radio signals of this positioning support device with different locations. Such an association may be considered a radio image. The data for the radio image may have been assembled using a particular version of a set of values of parameters. The assembly may comprise for instance a compression, and the version of the set of values of parameters may comprise for instance various parameters for such a compression, which may serve at the same time for a corresponding decompression. Different versions may comprise values of different parameters and/or different values for the same parameters. The data may further have been at least partially encrypted. An encryption key that was used for the encryption may then be linked specifically to the used version of the set of values of parameters. The apparatus may therefore try to decrypt the at least partially encrypted data; and if the attempt is successful when using a particular encryption key, the apparatus may derive the version of the set of values of parameters that has been used for assembling the data. Certain embodiments of the second aspect of the invention provide that data defining a radio image is assembled for a respective positioning support device using a particular version of a set of values of parameters and that the data is at least partially encrypted using an encryption key that is associated with the employed version of a set of values of parameters. The assembled and at least partially encrypted data defining a radio image may then be caused to be stored specifically in the positioning support device which transmits the signals generating the radio image. Certain embodiments of the third aspect of the invention provide that a positioning support device is enabled to transmit such version dependent at least partially encrypted data defining a radio image that is generated by its own radio signals.

Certain embodiments of the invention may have the effect that they enable mobile devices to determine their own position based on detected radio signals and on data which enables a determination of expected characteristics of radio signals at different locations. Certain embodiments of the invention may have the effect that they contribute to a self-contained positioning system that does not require an Internet connection or a wired connection to a server of a positioning provider to download the required data to such mobile devices. Certain embodiments of the invention may have the effect that they enable mobile devices with very small memory to determine their own position using such data, since the mobile devices will only need to store data for positioning support devices that may be observed at their current location. The number of positioning support devices for which data has to be stored at the same time at a mobile device may thus be quite small compared to the entire data for positioning support devices of a whole site, like a whole building or a whole floor of a building.

Using furthermore an encryption for certain embodiments may serve for adding security to the system, since it may prevent others from disturbing the positioning system intentionally or by accident. Using an encryption may also serve for limiting the users of the system to a certain group of users, if desired. Certain embodiments of the invention may have the effect that the version of employed values of parameters that are used for assembling radio image data may be deduced from an encryption key that was used for encrypting assembled radio image data at least partially. This may have the effect that no server is needed for controlling the versioning of configuration parameters, which further supports the efficient use of a self-contained positioning system. It may further have the effect that no additional storage space is needed at the positioning support device for storing an indication of the used version, meaning that more of the available storage space may be used for the data of the actual radio image, if appropriate. Alternatively or in addition, it may have the effect that less data has to be transmitted by the positioning support devices, which may reduce the energy that is needed for transmitting the same content. The possibility to obtain knowledge about the version may also be used in managing a self-contained positioning system, for instance by enabling a detection of problems occurring with a particular version of a set of values of parameters.

Figure 2:
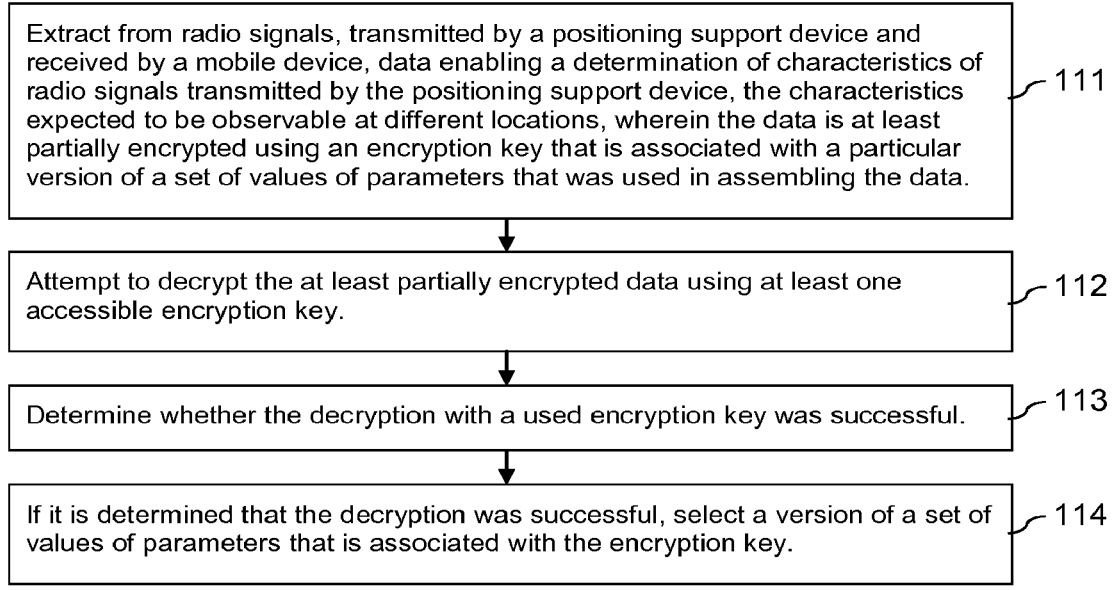
FIG. 2 is a flow chart illustrating an example embodiment of a method according to the first aspect.
Figure 3:
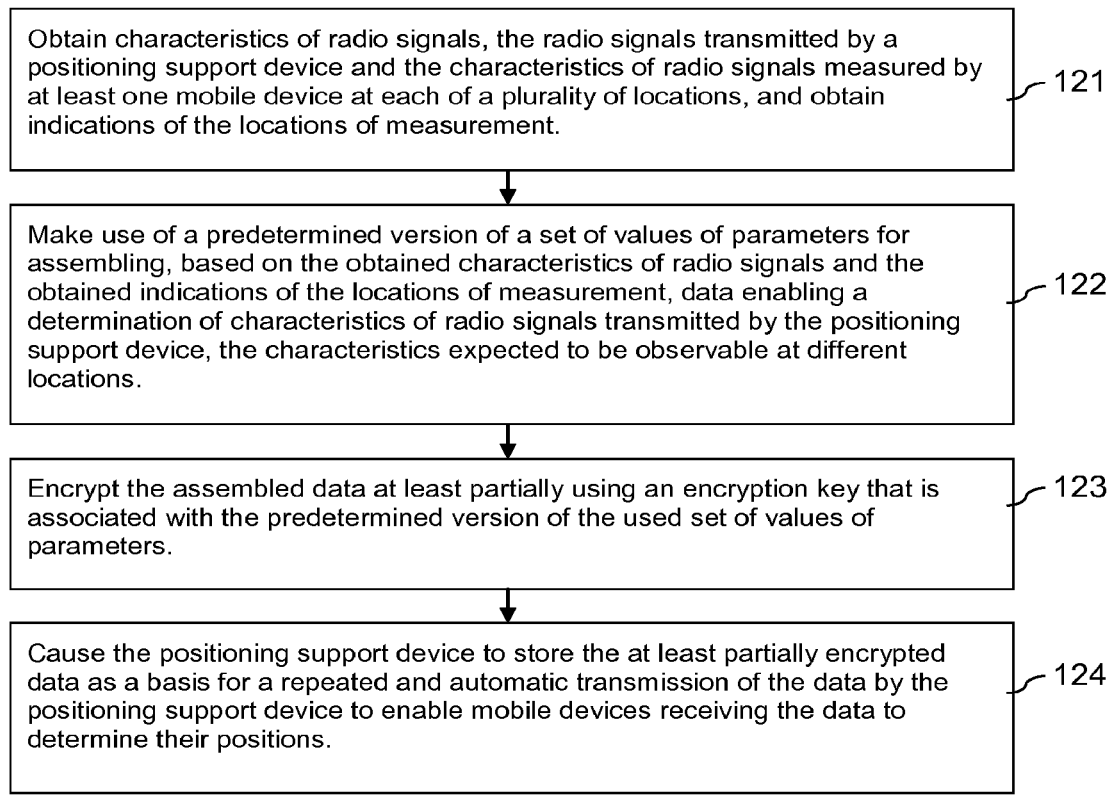
FIG. 3 is a flow chart illustrating an example embodiment of a method according to the second aspect.
Figure 5:
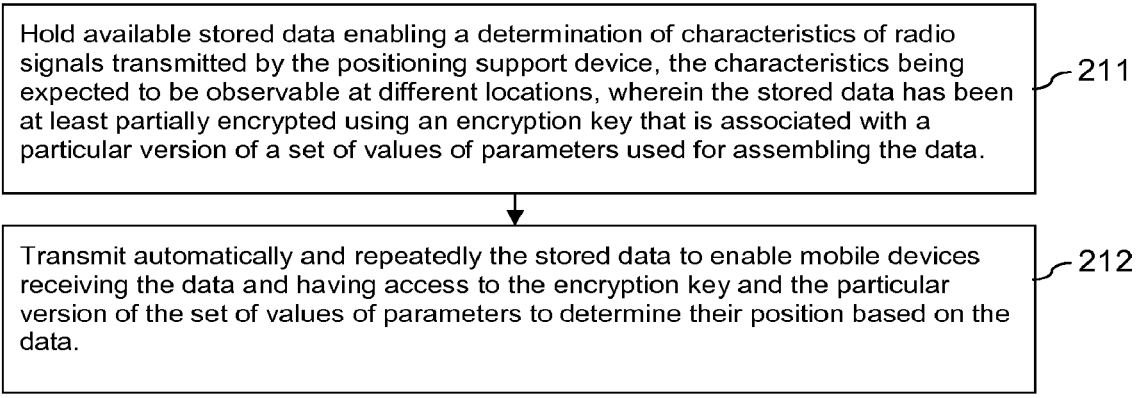
FIG. 5 is a flow chart illustrating an example embodiment of a method according to the third aspect.

Apparatus 100 illustrated in FIG. 1, apparatus 200 illustrated in FIG. 4 and the methods illustrated in FIGS. 2, 3 and 5 may be implemented and refined in various ways.

In order to be able to transmit data, a positioning support device may comprise any kind of terrestrial transmitter, in particular, though not exclusively, any kind of non-cellular terrestrial transmitter.

In an example embodiment of either aspect, a positioning support device is or comprises at least one of a Bluetooth beacon, a Bluetooth beacon enabling Bluetooth low energy mode, and a Bluetooth low energy beacon. Bluetooth beacons are already installed in many buildings. Furthermore, Bluetooth technologies are supported by many mobile user devices by default, like by most smartphones, tablets, laptops and feature phones. Using Bluetooth beacons and/or BLE beacons as positioning support devices may thus have the effect that the supported positioning may be based in some embodiments on an existing infrastructure in buildings and/or on existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The beacons may be stand-alone devices or be integrated into or attached to some other device. The use of Bluetooth low energy may enable a positioning with limited energy consumption at all involved devices.

A Bluetooth beacon that is employed for the invention may be any kind of Bluetooth beacon complying with any present or future standard. It is to be understood, however, that other types of positioning support devices than variations of Bluetooth beacons may be used as well, for instance tags or other devices that are configured to transmit ultra-wideband (UWB) signals or ultra-sound signals or any wireless signals that might emerge in the future.

In example embodiments of the first aspect, the decrypted data is processed taking account of the selected version of a set of values of parameters. Such processing may comprise for instance decompression operations and/or operations for determining a set of characteristics of radio signals transmitted by the positioning support device. The processing may include for example a decompression of the data in order to reconstruct radio image data. In example embodiments of the first aspect, furthermore a position of the mobile device may be estimated based on the decrypted and processed data. Alternatively or in addition, the apparatus may cause storage of the decrypted and processed data for repeated use in position estimations. A position may be estimated for instance by matching observed characteristics of radio signals transmitted by at least one positioning support device with a reconstructed radio image of the at least one positioning support device.

In example embodiments of either aspect, the data enabling a determination of characteristics of radio signals is transmitted in a broadcast and/or as advertising data and/or as advertising data in at least one air interface packet and/or using at least one advertising channel and/or using at least one advertising channel that is provided for broadcasts. Each of these embodiments may have the effect that a mobile device that is to be positioned does not have to be enabled to open a communication channel and that the positioning may thus be accelerated. This may further have the effect that the data that is transmitted in a single broadcast may be used by many mobile devices. This may save bandwidth as well as energy at the positioning support device. Advertising data is furthermore widely used for discovery of radio transmitters, which may enable a convenient adaptation of existing approaches for transmitting conventional advertising data for transmitting the data stored in a positioning support device according to the invention.

In an example embodiment, the characteristics of radio signals that are observed and the characteristics of radio signals that are expected to be observable at different locations comprise values relating to received signal strengths of radio signals. Using received signal strength related values as characteristics of radio signals may have the effect that such values may be determined for any kind of transmitter. It may further have the effect that they may be measured at a receiving end without establishing any connection with the transmitting end. A value relating to a received signal strength of a radio signal may be for instance a received signal strength indication RSSI or a physical Rx level in dBm with a reference value of 1 mW, etc. Another kind of value relating to a received signal strength of a radio signal may be for instance an indication of a path loss of a radio signal at a particular location. Other possible characteristics may comprise a timing advance (TA) value or a round-trip time value.

The parameters may comprise for instance any kind of parameter that may be used in assembling original and/or processed radio image data, like one or more grid parameter(s), one or more parameter(s) for a compression of radio image data, like energy related criteria for a compression and/or code book(s), one or more error detection code polynomial(s), positioning filters parameters, etc.

In an example embodiment of a system according to the invention, the data in different apparatuses of the third aspect has been at least partially encrypted using encryption keys that are associated with at least two different versions of a set of values of parameters used for assembling the data. This may be the case, for instance, if a system has been installed using a first version of a set of values of parameters for each of a plurality of positioning support devices, while some positioning support devices have later been exchanged or added in the system using at least a second version of a set of values of parameters. Alternatively or in addition, a system may comprise positioning support devices at different localization sites, and these localization sites may have been equipped with the positioning support devices at different points of time using different versions of a set of values of parameters.

Accordingly, in an example embodiment of the first aspect, the at least one encryption key is one of a plurality of encryption keys that are stored in the mobile device and that are accessible to the apparatus, each encryption key being associated with another version of the set of values of parameters stored in the mobile device. This may have the effect that the approach is backward compatible. When starting to use a new version of a set of values of parameters for assembling data, for instance because better results are expected with the new version, it may be expected that positioning support devices that already store their own radio image data will not be updated or at least not be updated right away. Thus, in order to position a mobile device, access to older versions of a set of values of parameters may be required, and the respectively correct version may be determined based on the correct encryption key. In order to find the correct encryption key, the apparatus could start for instance with the newest encryption key when attempting to decrypt the at least partially encrypted data, and proceed with the next older key, until the correct key is found. If a correct encryption key has been found for a particular positioning support device at a particular localization site, the search for the correct encryption key for further positioning support devices at the same localization site may also start off with this encryption key.

To provide an example, in a first building, the encrypted data may be successfully decrypted with a first encryption key and this will further indicate the parameter values of a first version of values of parameters for further processing of the data. Such parameter values may include by way of example a first code book for entropy encoding and decoding, a first error detection polynomial for generating an error detection code value for encrypted data, possibly a first error detection polynomial for generating an error detection code value for encrypted and non-encrypted data and a first hop factor for creating a grid representing a radio image. In a second building, the encrypted data may be successfully decrypted with a second encryption key and this will further indicate the parameter values of a second version of values of parameters for further processing of the data. Such parameter values may include by way of example a second code book for entropy encoding and decoding, a second error detection polynomial for generating an error detection code value for encrypted data, possibly a second error detection polynomial for generating an error detection code value for encrypted and non-encrypted data and a second hop factor for creating a grid representing a radio image.

In an example embodiment of the second aspect, the apparatus assembling the radio image data may only have access to the most recent version of the set of values of parameters and to the associated encryption key. This may be sufficient for enabling the apparatus to set up new systems and to update existing systems, since it may be assumed that new positioning support devices will generally be set up using the most recent version of the set of values of parameters.

However, in another example embodiment of the second aspect, the predetermined version of a set of values of parameters is one of a plurality of versions of the set of values of parameters accessible to the apparatus and the encryption key that is associated with the predetermined version of the used set of values of parameters is one of a plurality of encryption keys accessible to the apparatus, each of the plurality of encryption keys being associated with another one of the plurality of versions of the set of values of parameters. This may have the effect that the same library or the same group of libraries containing the different versions of values of parameters and associated encryption keys may be used by an apparatus generating the radio image data and by an apparatus determining the position of a mobile device. It may further have the effect that an apparatus generating radio image data may also be used for checking the quality of systems of positioning support devices that have been configured in the past.

In an example embodiment of the first aspect, the at least partially encrypted data comprises an error detecting code value computed based on at least a part of the encrypted part of the at least partially encrypted data before encryption. Determining whether the decryption was successful may then comprise computing an error detecting code value based on at least a part of the encrypted part of the at least partially encrypted data after the attempt of decryption, and comparing the extracted error detecting code value with the computed error detecting code value. Equal error detecting code values indicate a successful decryption. The at least partially encrypted data may comprise for instance, though not necessarily, encrypted data and non-encrypted data, wherein the non-encrypted data may comprise the error detecting code value that is computed based on at least a part of the encrypted data before encryption. Using an error detecting value may have the effect that it can be determined easily and reliably whether the decryption using a particular encryption key was successful. It is to be understood, though, that any other error detecting code may be used as well.

In an example embodiment of the second aspect, assembling the data comprises computing an error detecting code value at least for a part of the assembled data that is to be encrypted.

In order to obtain the most reliable result, all of the data that is to form part of the encrypted data may be used for computing the error detecting code value. It is to be understood, however, that in certain embodiment, it is also possible to use only a predetermined part of this data, in order to reduce the processing load at the apparatus according to the first aspect and the apparatus according to the second aspect.

In an example embodiment of the first aspect, the extracted data has been encrypted at least partially using a block encryption. Accordingly, in an example embodiment of the second aspect, the apparatus may encrypt assembled data at least partially using a block encryption. Further accordingly, in an example embodiment of the third aspect, the stored data has been encrypted at least partially using a block encryption. Using a block encryption may have the effect that the encryption may be particularly secure. The amount of data that is encrypted may be selected for instance such that it corresponds exactly to one block. An example block encryption is an encryption complying with the advanced encryption standard (AES), which supports encryption with blocks of different fixed lengths. It is to be understood that alternatively other block encryption approaches as well as non-block cipher approaches, including dynamic size encryption approaches, may be used for the encryption. Using a non-block encryption may have the effect that storage space and transmissions may be used more effectively.

In an example embodiment of any aspect, the at least partially encrypted data on a radio image comprises a non-encrypted error detection code value. The non-encrypted error detection code value may be in the form of a cyclic redundancy check value, which is simple to implement. The non-encrypted error detection code value may be an error detection code value for the encrypted part of the at least partially encrypted data before encryption. This may have the effect that it can be used for determining the correct encryption key, as described further above. Alternatively or in addition, the non-encrypted error detection code value may be an error detection code value for the encrypted part of the extracted data and a non-encrypted part of the extracted data. This may have the effect that transmission errors may be detected for the entire data that is received.

In an example embodiment of any aspect, the at least partially encrypted data on a radio image comprises a non-encrypted identification of the positioning support device. This may be for instance a MAC address or any other identifier that is permanently associated with the positioning support device. It may have the effect that received radio signals may be associated with a particular positioning support device. In an example embodiment of any aspect, the at least partially encrypted data on a radio image comprises a non-encrypted indication of an image offset. The offset may be an offset of the geographical location of the radio image compared to a general origin. Using a general origin may have the effect that the combined consideration of several radio images may be facilitated. In an example embodiment of any aspect, the at least partially encrypted data on a radio image comprises a non-encrypted indication of an image size. This may have the effect that the size of the radio image may allow reflecting the actual coverage of a positioning support device. In an example embodiment of any aspect, the at least partially encrypted data on a radio image comprises an encrypted indication of an origin. The original may be a general origin that is used for various radio images, or it may be an origin specific to the radio image, for instance the geographical location of a certain corner of the radio image, in case the definition of the radio image covers a rectangular geographical area. In an example embodiment of any aspect, the at least partially encrypted data on a radio image comprises encrypted selected frequency values of a frequency transform of a radio image representing the characteristics of radio signals expected to be observable at different locations. Suitably selected frequency values of a frequency transform of a radio image enable a high compression, while allowing at the same time a fairly exact reconstruction of the original radio image. Optionally, the selected frequency values may have been compressed further before encryption, for example using any kind of lossless compression.

In an example embodiment of the third aspect, the stored at least partially encrypted data comprises encrypted data and non-encrypted data. The positioning support device may receive and store at least a part of the encrypted and non-encrypted data. That is, some of the stored partially encrypted data, in particular some of the non-encrypted data, may for instance be generated internally. The received non-encrypted data may comprise a first error detection code value for at least a part of the received encrypted data before encryption. The positioning support device may further compute a second error detection code value at least for the received encrypted and non-encrypted data, wherein the second error detection code value is not encrypted. That is, the second error detection code value may be computed for encrypted and non-encrypted data in common. It is to be understood that the second error detection code value may also cover more data than the stored and partially encrypted data, e.g. all data of a packet that is to be transmitted by the positioning support device and that includes the partially encrypted data. The second error detection code may be transmitted along with the stored data.

Figure 6:
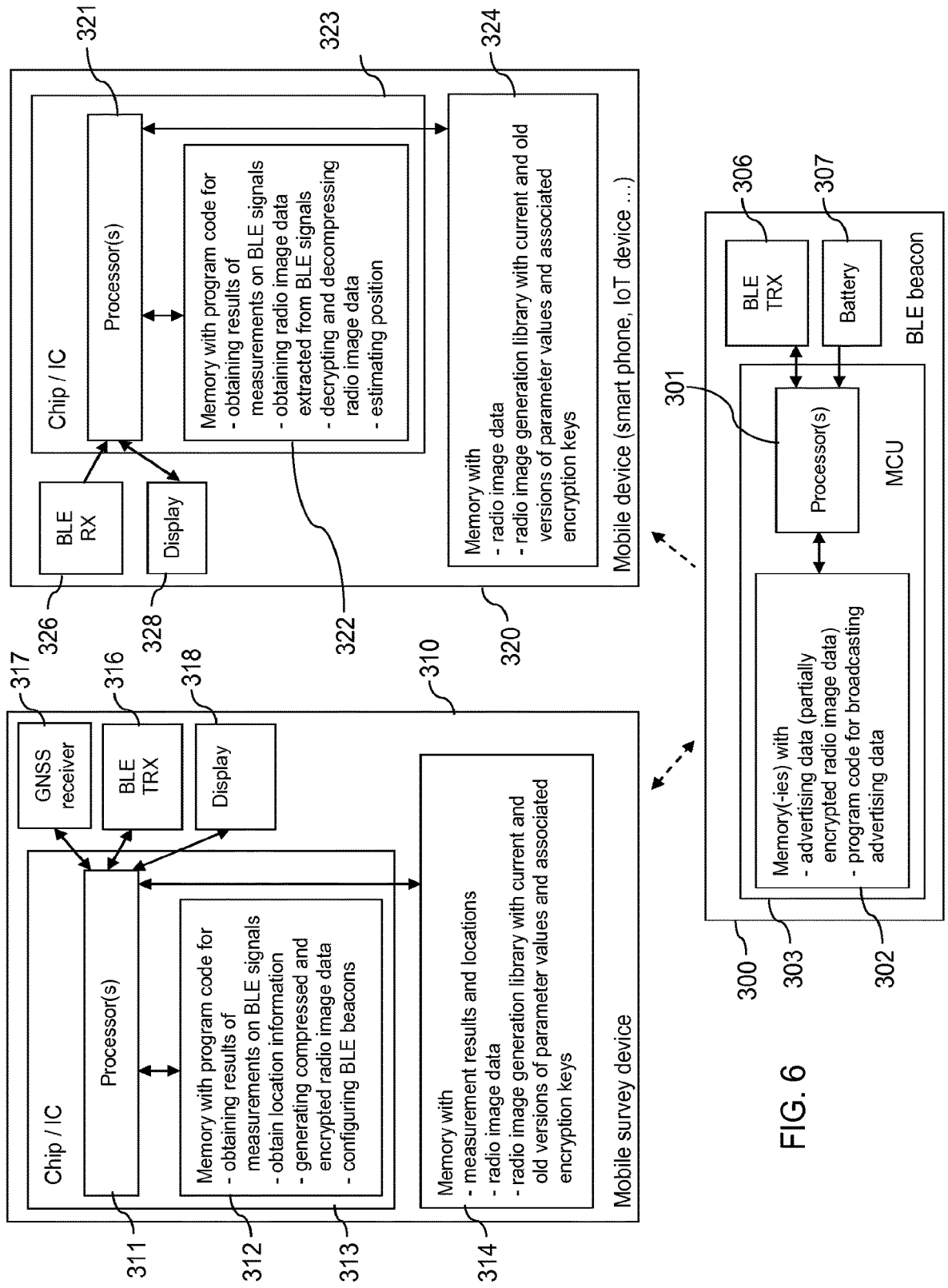
FIG. 6 is a schematic block diagram of an example embodiment of a system comprising an example embodiment of an apparatus according to the first aspect, an example embodiment of an apparatus according to the second aspect and an example embodiment of an apparatus according to the third aspect.

FIG. 6 is a schematic block diagram of an example embodiment of a system supporting a versioning of parameters, the system making use of example embodiments of the three aspects of the invention.

The system comprises a plurality of BLE beacons 300, a mobile survey device 310 and mobile devices 320 that may desire to determine their own position.

The BLE beacons 300, of which only one is shown in FIG. 6, are distributed at a certain site. The BLE beacons are example positioning support devices. They may but do not have to be distributed evenly throughout the site.

Each BLE beacon 300 comprises at least one processor 301 that is linked to at least one memory 302 and to a BLE transceiver (TRX) 306. Each BLE beacon 300 further comprises a battery 307.

Processor 301 is configured to execute computer program code, including computer program code stored in memory 302, in order to cause BLE beacon 300 to perform desired actions.

Memory 302 may be a main memory of BLE beacon 300. Memory 302 is configured to store advertising data and computer program code. Memory 302 stores computer program code for broadcasting advertising data and computer program code for updating advertising data in memory 302. Some of the data in memory 302 may be similar to the data in memory 202. Some of the program code in memory 302 may be similar to program code in memory 202. In addition, memory 302 may store computer program code configured to realize other functions, for instance computer program code for computing a cyclic redundancy check (CRC) value and computer program code for determining a battery state indication and for including such indication in broadcast advertising data. In addition, memory 302 may also store other kind of data, for instance a transmission frequency value.

Processor 301 and memory 302 may optionally belong to a microcontroller unit (MCU) 303 of an integrated circuit on a single chip. The integrated circuit or the chip may comprise in addition various other components, for instance a further processor or memory.

It is to be understood that the content of memory 302 may also be distributed to several memories. For example, a first memory may be provided for storing the computer program code and a second memory may be provided for storing data.

BLE transceiver 306 is a component which enables beacon 300 to transmit and receive signals in line with any current or future version of the Bluetooth standard supporting a low energy mode.

Battery 307 is connected to any component of BLE beacon 300 that requires power supply, for instance to BLE transceiver 306 and to processor 301 of MCE 302. Battery 307 or a circuitry comprising battery 307 may furthermore be configured to constantly or regularly provide an indication of the current battery state to processor 301. Battery 307 may or may not be exchangeable.

It is to be understood that beacon 300 may comprise various other components.

Component 303 or beacon 300 may be an example embodiment of an apparatus according to the third aspect of the invention.

While only a single beacon 300 is depicted in FIG. 6, it is to be understood that other beacons of the plurality of BLE beacons may have the same or similar structure as beacon 300.

Mobile survey device 310 may be for instance a regular mobile terminal, like a smartphone or general purpose tablet PC, or a dedicated survey device. Mobile survey device 310 comprises a processor 311 that is linked to a first memory 312, to a second memory 314, to a BLE component 316, optionally to at least one GNSS receiver 317 and to a display 318.

Processor 311 is configured to execute computer program code, including computer program code stored in memory 312, in order to cause mobile survey device 310 to perform desired actions.

Memory 312 stores computer program code for obtaining results of measurements on BLE signals, computer program code for obtaining location information, computer program code for generating compressed and encrypted radio image data and computer program code for configuring BLE beacons. All of this computer program code may belong for instance to a survey application. Some of the program code in memory 312 may be similar to program code according to the first aspect in memory 102. In addition, memory 312 may store computer program code configured to realize other functions, for instance computer program code for providing feedback to a user of mobile survey device 310 on the progress of a current survey, etc. In addition, memory 312 may also store any kind of data.

Processor 311 and memory 312 may optionally belong to a chip or an integrated circuit 313, which may comprise in addition various other components, for instance a further processor or memory.

Memory 314 is configured to store data, including for example results of measurements on BLE signals, associated locations of measurement and generated radio image data. It is further configured to store different versions of a set of values of parameters for generating radio image data and a respectively associated encryption key. The parameters may be configuration parameters and comprise for instance parameters that can be used in assembling grid based radio image data and in compressing the radio image data, a CRC polynomial and positioning filters parameters, etc. Each version of a set of values of parameters and the associated encryption key may be stored for instance in a separate radio image generation library. Alternatively, a single radio image generation library may be defined such that it is suited to comprise different versions of a set of values of parameters and the associated encryption keys. A second, possibly version independent CRC polynomial may be stored in addition, for example as a part of the single or of each radio image generation library. Memory 314 may be configured to store any other desired data as well.

In certain embodiments, a radio image generation library with different encryption keys and associated versions of a set of values of parameters or different radio image generation libraries for each version may be preinstalled in mobile device 310; alternatively, such keys and values of parameters may be received over the air from a server.

BLE component 316 includes at least a BLE transceiver (TRX). BLE component 316 is configured to scan for radio signals that are broadcast by BLE beacons 300 and to perform radio measurements on such radio signals. In addition, BLE component 316 is configured to enable mobile survey device 310 to establish a BLE connection with BLE beacons 300. It is to be understood that any computer program code based processing required for receiving, evaluating and transmitting BLE signals may be stored in an own memory of BLE component 316 and executed by an own processor of BLE component 316, or it may be stored for example in memory 312 and executed for example by processor 311.

The at least one GNSS receiver 317 may comprise any kind of global navigation satellite signal receiver, for example a GPS receiver and/or a GLONASS receiver and/or a GALILEO receiver. It may be configured to receive corresponding satellite signals and to determine the current position of mobile survey device 310 based on the signals, possibly using provided assistance data.

Display 318 may be for instance a touchscreen.

It is to be understood that mobile survey device 310 may comprise various other components, like further user input and output means, a cellular communication component enabling a communication via cellular communication networks and/or a WLAN component enabling a communication via WLANs.

Component 313 or mobile survey device 310 may be an example embodiment of an apparatus according to the second aspect of the invention.

It is to be understood that several mobile survey devices 310 could be provided for use in the system of FIG. 6.

Also of the mobile devices 320 that may desire to determine their own position only one is shown in FIG. 6. Each mobile device 320 may be for instance a regular mobile terminal, like a smartphone or general purpose tablet PC, or it may be for instance an IoT device, like a smart watch or a smart band, etc. Mobile device 320 comprises a processor 321 that is linked to a first memory 322, to a second memory 324, to a BLE component 326 and to a display 328.

Processor 321 is configured to execute computer program code, including computer program code stored in memory 322, in order to cause mobile survey device 320 to perform desired actions.

Memory 322 stores computer program code for obtaining results of measurements on BLE signals, computer program code for obtaining radio image data extracted from BLE signals, computer program code for decrypting extracted radio image data, computer program code for decompressing and/or otherwise processing decrypted radio image data and computer program code for estimating a position of mobile device 320. All of this computer program code may belong to a positioning application. Some of the program code in memory 322 may be similar to program code according to the second aspect in memory 102. In addition, memory 322 may store computer program code configured to realize other functions, for instance computer program code of various applications, some of which may rely on being provided with an estimate of the current position of mobile device 320. In addition, memory 322 may also store other kind of data.

Processor 321 and memory 322 may optionally belong to a chip or an integrated circuit 323, which may comprise in addition various other components, for instance a further processor or memory.

Memory 324 is configured to store data, including for example results of the latest measurements on BLE signals and recently received and/or processed radio image data. It is further configured to store the same different versions of a set of values of parameters for generating radio image data and a respectively associated encryption key as memory 314 of mobile survey device 310. Again, the data may be stored for instance in the scope of a single radio image generation library or in different radio image generation libraries for each version. By way of example, it will be assumed in the following that a single library is used both in memory 314 and memory 324. Memory 324 may be configured to store any other desired data as well.

In certain embodiments, a radio image generation library with different encryption keys and associated versions of a set of values of parameters or different radio image generation libraries may be preinstalled in mobile device 320; alternatively, such keys and values of parameters may be received from a server or some other device over the air.

BLE component 326 includes at least a BLE receiver (RX). It is to be understood that the BLE receiver may also be a part of a BLE transceiver. BLE component 326 is configured to scan for radio signals that are broadcast by BLE beacons 300, to perform radio measurements on such radio signals and to extract advertising data contained in detected BLE signals. It is to be understood that any computer program code based processing required for receiving and evaluating BLE signals may be stored in an own memory of BLE component 326 and executed by an own processor of BLE component 326, or it may be stored for example in memory 322 and executed for example by processor 321.

Display 328 may be for instance a touchscreen.

It is to be understood that mobile device 320 may comprise various other components, like further user input and output means. Furthermore, while the invention enables a positioning of mobile devices that have neither a cellular communication component enabling a communication via cellular communication networks nor a WLAN component enabling a communication via WLANs, it is to be understood that certain embodiments of mobile device 320 may comprise such components as well.

Component 323 or mobile device 320 may be an example embodiment of an apparatus according to the first aspect of the invention.

While only a single mobile device 320 is depicted in FIG. 6, it is to be understood that other mobile devices may have the same or similar structure as mobile device 320.

An example implementation and use of the system of FIG. 6 may be summarized as comprising the steps of placing BLE beacons in an environment, surveying a site and generating compressed radio images using a current version of values of parameters, partially encrypting the compressed radio image data using an encryption key associated with the used version of the values of parameters, configuring beacons to transmit this radio image data as advertising data, and positioning mobile devices using BLE advertising data.

Corresponding example operations in the system of FIG. 6 will now be described with reference to FIGS. 7 to 10.

The BLE beacons 300 of the system of FIG. 6 are arranged at a localization site, by way of example in a large building like a shopping mall, such that at least one BLE beacon may be observed at each location of the localization site at which a positioning of mobile devices is to be supported. The BLE beacons 300 may be placed for example in the form of a grid with a specified distance, approximately, between the BLE beacons 300, such that the location of each BLE beacon may be considered a grid point of the grid. The specified distance may be selected depending on the transmission power and thus the coverage range of the BLE beacons 300; in an example embodiment, the distance may be set to 8 meters. The BLE beacons 300 may or may not be physically fixed to their location, but in any case, it is assumed that all or most of them will remain at their location for a longer time.

Figure 7:
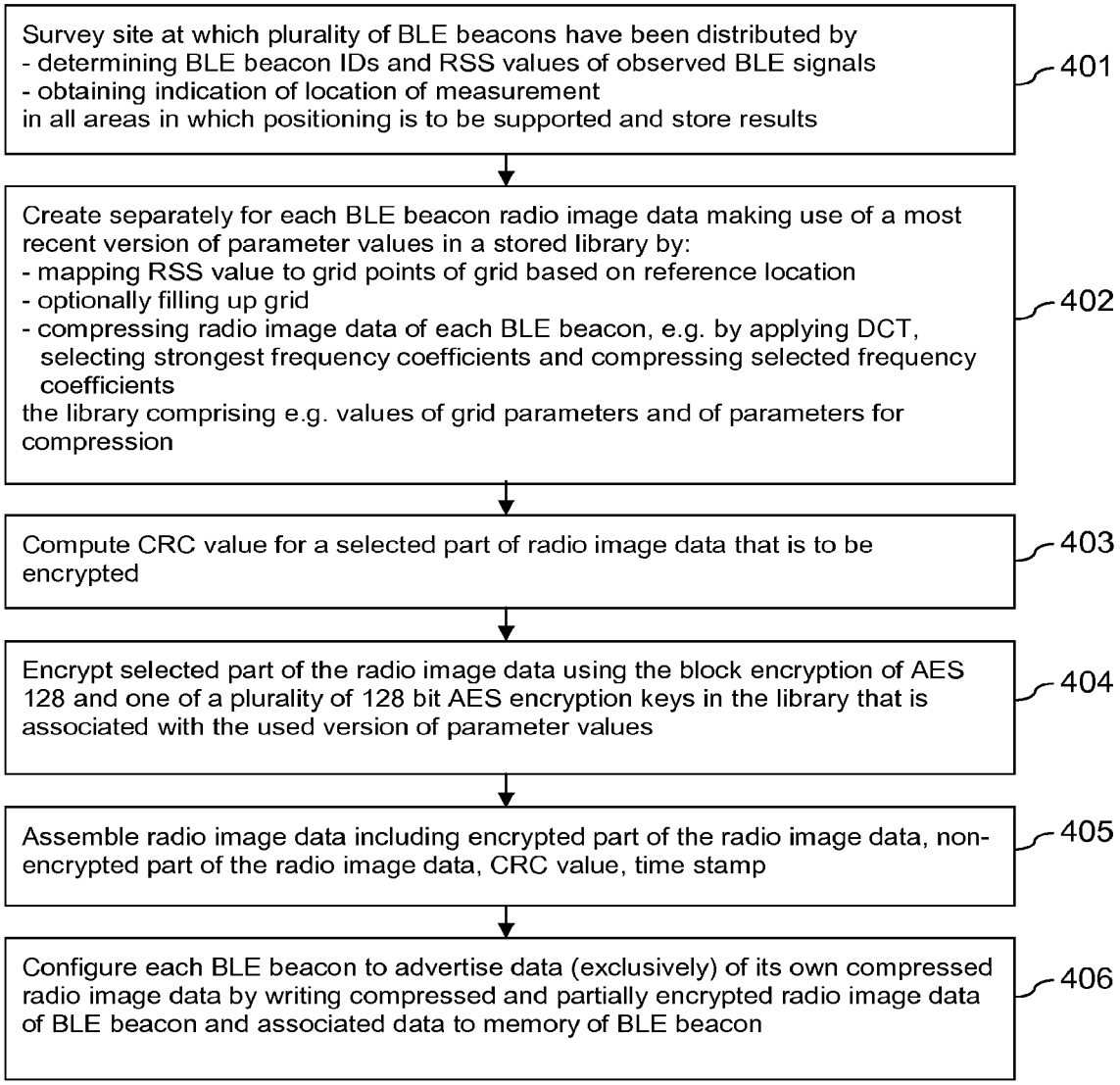
FIG. 7 is a flow chart illustrating an example embodiment of operations in the system of FIG. 6.

FIG. 7 is a flow chart illustrating example operations at mobile survey device 310. Processor 311 and some of the program code stored in memory 312 may cause mobile survey device 310 to perform the presented actions when the program code is retrieved from memory 312 and executed by processor 311.

The purpose of the operations of FIG. 7 is to detect radio images of each of a plurality of BLE beacons 300 distributed in the building and to configure the BLE beacons 300 based on the obtained information. The operations may be performed only once—or be repeated at fairly long intervals in order to enable updates in the case of changes in the arrangement of BLE beacons or changes in the radio environment due to construction measures, like relocation of internal walls, etc.

A survey agent using mobile survey device 310 is requested to activate a survey application of mobile survey device 310 and to visit all areas of interest at which a positioning is to be supported so that mobile survey device 310 may survey the radio environment of the building. (action 401)

The survey application may activate to this end BLE component 316. BLE component 316 scans for radio signals from BLE beacons 300 in the environment at regular intervals while the survey agent is slowly moving through the building. The survey agent may be guided, for instance, by a floor plan displayed on display 318 of mobile survey device 310. Whenever BLE component 316 detects at least one BLE radio signal during a scan, BLE component 316 measures the received signal strength (RSS) of each radio signal and extracts a medium access control (MAC) address of the transmitting BLE beacon 300 from the radio signal. The measured radio signal strength values may then be considered to be characteristics of the observed radio signals and the MAC addresses may be considered identifiers (ID) of the BLE beacons transmitting the radio signals.

In addition, an indication of the current position of mobile survey device 310 is obtained for each location at which measurements are performed during a scan. The survey agent may be required for example to enter information on a respective measurement location, for instance based on a grid covering the floor plan presented on display 318. The survey agent may be enabled to enter such information in various ways via any kind of user interface. The input as such may be enabled for instance by means of a touch sensitive screen of display 318 or by means of keys and/or buttons of mobile survey device 310 in combination with a display of mobile survey device 310 that is not touch sensitive. Alternatively, GNSS receiver 317 may be activated automatically as well by the survey application. GNSS receiver 317 may capture satellite signals and estimate the position of mobile survey device 310 at the same regular intervals in which scans for BLE radio signals are performed, for example once per second. Since the satellite signals may be difficult to receive within buildings, such a positioning may be an assisted GNSS (AGNSS) based positioning using available assistance data. The assistance data may be provided for example by some GNSS assistance server via a cellular communication network. The indicated position may have a horizontal component, for instance a longitude value and a latitude value, or easting and northing values. In addition, it may have an indication of the floor on which the survey agent is located. The indication of the floor may be obtained for instance in either case from a general input by the survey agent when reaching a new floor. Alternatively, the position estimated by GNSS receiver 317 may include an altitude component, and the altitude may be mapped to a respective floor based on a reference altitude of the ground floor and some general or building specific information on the height of floors.

In the case of a GNSS based positioning, an indication of the respective position of the survey agent may be indicated on the floor plan as well as a further guidance. Alternatively, the survey agent may try to uniformly pass through all parts of the building on his own. Some feedback may equally be given to the survey agent on display 318 to indicate which areas have already been covered.

It is to be understood that alternatively or in addition, other means may be used for determining the locations of measurements. For example, at least one motion sensor, like an accelerometer and/or a gyroscope, and/or a magnetometer may also be used in combination with a manual input or with GNSS estimated positions to collect information on the locations of measurements.

The RSS values and the associated BLE beacon IDs obtained during a scan as well as the obtained indication of the location of measurement are stored in memory 314.

Once the survey of the building has been completed, mobile survey device 310 creates compressed radio image data separately for each BLE beacon 300 based on the stored data. (action 402) In this, it makes use of the most recent version of a set of values of parameters in the radio image generation library in memory 314.

Such a DCT compression of the radio image of a BLE beacon 300 may be suited to reduce the size of the image to few tens of bytes. The following table shows a representation of an example radio image of a BLE beacon after DCT compression and an example further compression:

| Origin (Lat; long; floor) | Image offset | Image size | DC Component | AC components | | | | | |
|---|---|---|---|---|---|---|---|---|---|
| [61.45; 23.68; 2] | [−148; 96; 0] | [17; 18] | −99 | Offset | 3 | 0 | 0 | 5 | 0 |
| | | | | Value | −58 | −51 | 30 | 23 | 20 |

Mobile survey device 310 defines for each BLE beacon 300 for which data is stored a grid, with grid points corresponding to geographical locations in the building, such that the grid covers at least the coverage area of the particular BLE beacon 300. The size of the grid may be defined by the used set of values of parameters, or the size may be adjusted based on the locations of measurements at which signals of the particular BLE beacon 300 have been detected. The grid may be a three-dimensional grid having for instance the form of a cuboid, in order to cover different floors of the building. Alternatively, a separate rectangular two-dimensional grid may be defined for each floor of the building on which radio signals of the particular BLE beacon 300 have been detected. Mobile survey device 310 then maps each stored RSS value that is associated in memory 314 with the BLE beacon identifier of the particular BLE beacon 300 to a grid point of the grid defined for this BLE beacon. The grid point to which the RSS value is mapped corresponds to a geographical location that is closest to the location of measurement associated in memory 314 with the RSS value. If several RSS values for the same BLE beacon 300 would have to be mapped to the same grid point, these RSS values may be averaged and the average value may be mapped to the grid point of the grid that is defined for the particular BLE beacon 300.

There may be some grid points of the grids to which no RSS values have been mapped. In case the further processing requires grids with an RSS value mapped to each grid point, these grid points without RSS values may be provided with RSS values by interpolating surrounding RSS values if possible, and by extrapolating neighboring RSS values otherwise.

Mobile survey device 310 may now compress the radio image of each BLE beacon.

The radio image may be compressed for instance by applying a discrete cosine transform (DCT) to the radio image data. If the RSS values mapped to the grid points of a K-dimensional grid are represented as elements of a K-dimensional matrix, applying a DCT to this matrix will result a matrix of the same dimension and size. Each matrix element of the resulting matrix may be considered a DCT component that is composed of a DCT index defining the position in the matrix and a DCT value. A compression may now be achieved by selecting the DCT components with the highest DCT values. The DCT indices of the selected DCT components and/or the DCT values of the selected DCT components may be compressed further using a lossless compression technique. A DC component, which indicates the average of the RSS values, may optionally be excluded from DCT operations and further compression operations.

Here, the origin may be for instance a common reference location that is defined by an arbitrary latitude value, an arbitrary longitude value and an arbitrary floor number. The origin does not necessarily lie inside the radio image or correspond to any of its corners; it may be hundreds of meters away from the area covered by the radio image and even from the area covered by all radio images that may be generated for the building. This allows using one origin for models that are close by and combine them easier during position calculation. A model may be understood here for instance to be the entirety of all radio image data that are assembled for a particular building or for any other localization site. Alternatively, a separate origin may be defined for example for each building, e.g. composed of the smallest latitude value and the smallest longitude value defining the area of the building and a median floor number.

The image offset may indicate an offset of a reference grid point of the considered grid for a particular floor to the origin. The radio image offset for longitude and latitude is in units which are not necessarily degrees, but may be other arbitrary units, e.g. meters.

The image size may indicate the number of grid points in each direction starting from the reference grid point, and thus the size of a matrix to which the DCT may be applied.

The DC component of the radio image is calculated as the mean value of all elements of the original radio image.

The AC components are selected elements of a DCT representation of a zero mean radio image, that is, the radio image with subtracted DC component. An AC component is a pair of an AC value and an AC index (that is, the index of the element in the DCT matrix). In the presented example embodiment, only the five AC components with the largest magnitudes (squared AC values) are selected and stored. It is to be understood that any other number may be selected as well. The number may be fixed or selected such that a particular percentage of energy in the DCT image is conserved. The selected AC components enable a reconstruction of a radio image that is smoother but very similar to the original radio image. The selected AC components may be represented by the AC values of the selected AC components and associated AC offsets, which may constitute a losslessly compressed version of the AC indices. These AC indices may be represented for instance in a more compact way as a zigzag offsets. Offsets corresponding to 2D indices may be calculated to this end by traversing the DCT image (matrix), in which all DCT values except for the selected ones have been set to zero, in zigzag fashion and transforming the 2D indices into 1D indices, and then transforming consecutive 1D indices into offsets, where each offset represents the number of zero elements between the previous and the current AC component. Examples of resulting offsets are indicated in the table above.

The AC values and the associated offsets may be further compressed using a Huffman coding or any other entropy encoding with a fixed codebook.

It is to be understood that other frequency transforms than DCT may be used as well, which may be more complex but not require a grid with RSS values mapped to each grid point.

Alternatively, the radio image may be compressed by computing parameters of a parametric radio model of the radio environment of each BLE beacon 300, like a path loss model, based on the radio image data. This would allow representing the radio image of each BLE beacon 300 by a limited set of parameter values, like the location of the BLE beacon 300, a transmission power or apparent transmission power of the BLE beacon 300, and a path loss exponent. The apparent transmission power may be a transmission power that is observed or estimated to be observable at a reference distance from an estimated location of the BLE beacon 300, for instance at a distance of 1 meter. Such parameters may be computed for instance using a Gauss-Newton method. While a compression by means of a frequency transform may enable a more accurate reconstruction of the original radio image, the use of a parametric radio model may enable a particularly high compression of data. The latter approach would equally not require a filling up missing RSS values of the grid.

Any basic data that may be required for actions 401 and 402 may be comprised in the radio image generation library stored in memory 314. Such basic data may include for instance a size of grid cells, a hop factor as the spacing between grid points, a common origin, a fixed number of DCT components to be selected or such a percentage of energy to be conserved, at least one code book, etc.

Mobile survey device 310 now computes a first CRC value for a selected part of the compressed radio image data. (action 403) The CRC polynomial used to this end may equally be a part of the used version of a set of values of parameters stored in the radio image generation library in memory 314.

The selected part of the compressed radio image data may comprise for instance an indication of an origin, e.g. in the form of an origin latitude, an origin longitude and an origin floor number (floor id) as indicated for an example radio image in the above table. The selected part may comprise for instance a DC component as indicated for an example radio image in the above table. The selected part may comprise for instance AC components as indicated for an example radio image in the above table. Other parts, like an image offset and an image size as indicated for an example radio image in the above table may not be considered in the computation of the first CRC value.

Mobile survey device 310 then encrypts the part of the compressed radio image data, for which the first CRC value has been computed. (action 404) Mobile survey device 310 uses to this end an AES 128 block encryption. An AES 128 encryption processes data blocks of 128 bits using an encryption key with a length of 128 bit. The used encryption key is associated in the radio image generation library with the selected version of the set of values of parameters in the radio image generation library in memory 314. Depending on the amount of selected data, one or more data blocks may be processed during encryption.

Mobile survey device 310 assembles final radio image data including the encrypted part of the radio image data, the non-encrypted part of the radio image data, the CRC value and a time stamp. The time stamp may indicate a time at which the system was set up in the building. The time stamp may indicate for instance the current time, or for instance the time when the collection of data was completed in action 401. The assembled final radio image data may also comprise other data, like an indication of the number of blocks of encrypted data. (action 405)

Mobile survey device 310 may now subsequently establish a regular BLE connection with each detected BLE beacon 300. This may be performed based on the stored BLE beacon IDs. The survey agent needs to revisit to this end the coverage area of each BLE beacon 300. Mobile survey device 310 may guide the survey agent for instance to the location corresponding to the grid point to which the strongest RSS value was mapped for each BLE beacon 300, using a corresponding indication on display 318 of mobile survey device 310.

Once a connection with a particular BLE beacon 300 has been established, mobile survey device 310 configures this BLE beacon 300 to advertise the generated, compressed data of its own radio image. (action 406) To this end, mobile survey device 310 causes BLE beacon 300 to store the compressed data in an advertising data section of its main memory 302. In addition, mobile survey device 310 may specify other details that are to be considered by BLE beacon 300 for broadcasting advertising data, like a frequency of transmission. Mobile survey device 310 may use a fixed frequency to this end. For example, if the BLE advertising data allows 31 octets to send beacon specific advertising data, for most of the beacons two to three advertising packets may be enough to transfer DCT compressed radio image data. The typical size of DCT compressed data of a radio image in a building may be less than 60 bytes, and this may allow transmission of the radio image data within a second if a transmission frequency of advertising packets of 2 Hz is set. Alternatively, mobile survey device 310 may determine a frequency of transmission of advertising data such that all of the compressed data of the radio image may be advertised within a desired period of time, for example within a second. It is to be understood that the advertising data that is stored in memory 302 of BLE beacon 300 and broadcast by BLE beacon 300 using the set transmission frequency may not be limited to the compressed radio image data. Thus in the broadcast of BLE beacon 300, the compressed radio image data may alternate with any other data that may be stored in the advertising data section of memory 302.

Figure 8:
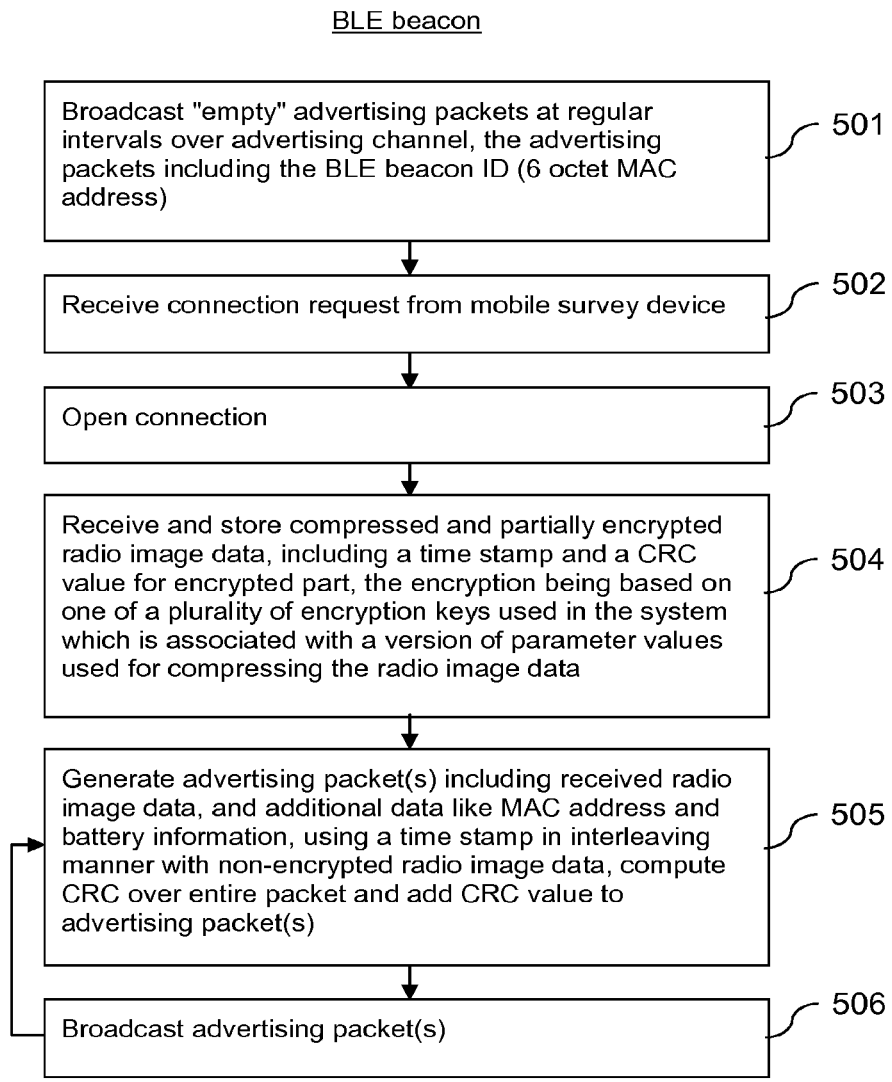
FIG. 8 is a flow chart illustrating an example embodiment of further operations in the system of FIG. 6.

FIG. 8 is a flow chart illustrating example operations at a BLE beacon 300. Processor 301 and some of the program code stored in memory 302 of the respective BLE beacon 300 may cause this BLE beacon 300 to perform the presented actions when the program code is retrieved from memory 302 and executed by processor 301.

The purpose of the operations of FIG. 8 is that each of the BLE beacons 300 is configured to broadcast its own compressed and partially encrypted radio image data.

After having been placed at its location within the building and activated, BLE beacon 300 broadcasts "empty" advertising packets at regular intervals over a low energy (LE) advertising broadcast channel. (action 501)

The following example details are based on the Specification of the Bluetooth® System Version 4.2 of Dec. 2, 2014 by the Bluetooth SIG. For further details, reference is made to this specification.

The LE advertising broadcast channel is provided to set up connections between two devices or to communicate broadcast information between unconnected devices. The LE advertising broadcast channel is a set of three fixed physical channels.

Each BLE packet that is transmitted over the air interface has a defined packet format that is used on a link layer for both advertising channel packets and data channel packets. The packet comprises a preamble of 1 octet, an access address of 4 octets, a packet data unit (PDU) of 2 to 257 octets, and a CRC of 3 octets. Advertising channel packets use a fixed value for the preamble and for the access address of the BLE packet. When a BLE packet is transmitted in an advertising physical channel, the PDU is a specifically defined advertising channel PDU. The CRC is calculated over the PDU.

The specifically defined advertising channel PDU comprises a header of 16 bits and a payload.

The header comprises, among other fields, a field for indicating a PDU type, a TxAdd field and a length field for indicating the payload length in octets. The possible range of the payload length is 6 to 37 octets.

The payload comprises an AdvA field of 6 octets for indicating a beacon's public or random device address, as indicated by the one bit TxAdd field in the header. In the present case, the beacon's public device address in the form of a 6 octet MAC address may be used, and the bit of the TxAdd field may be set to "0". The 6 octet MAC address functions as BLE beacon ID. The payload further comprises an AdvData field of 0 to 31 octets. The AdvData field may receive advertising data of any type that is stored in the advertising data section of main memory 302 of BLE beacon 300. In action 501, no data may be entered into this field when assembling and broadcasting advertising packets at regular intervals and thus the field may have a length of zero octets. Such advertising packets may be considered "empty" advertising packets. It is to be understood, however, that if the advertising data section of main memory 302 of BLE beacon 300 already contains some other data than compressed radio image data, this data may be contained in or distributed to AdvData fields of the broadcast advertising packets.

It is to be understood that any other packet format could be used just the same, for example though not exclusively a packet structure providing for an advertising data field of up to 255 octets in line with future Bluetooth specifications, etc.

The transmission intervals for the broadcast of advertising packets may be set to a default value. It may also comprise a random component in order to enable mobile devices to detect signals from all BLE beacons in the neighborhood.

When broadcasting empty advertising packets or advertising packets with other advertising data than compressed radio image data, BLE beacon 300 may receive a connection request from a mobile survey device 310. This request may be transmitted by mobile survey device 310 in the scope of action 406 of FIG. 7. (action 502)

BLE beacon 300 thereupon opens the connection. (503)

Via the established connection, BLE beacon 300 receives from mobile survey device 310 compressed and partially encrypted radio image data. The radio image data corresponds to the data that was assembled by mobile survey device 310 in action 405 specifically for the BLE beacon 300 receiving the data, and it contains exclusively radio image data for the BLE beacon 300 receiving the data. BLE beacon 300 stores the data in the advertising data section of main memory 302. (action 504)

Via the established connection, BLE beacon 300 may furthermore receive from mobile survey device 310 a requested transmission frequency for broadcasting advertising packets. BLE beacon 300 sets the transmission frequency accordingly, for instance by storing a corresponding indication in main memory 302.

Thereafter, BLE beacon 300 generates at least one advertising packet complying with the above referenced BLE 4.2 specification. The content of the data stored in the advertising data section of main memory 302 is distributed to the AdvData fields of the payload of the advertising PDUs of the required number of subsequent advertising packets. (action 505) The content of the PDU may be supplemented with additional general data by BLE beacon 300. Such additional data may comprise the MAC address of BLE beacon 300, battery information, etc. For each generated advertising packet, BLE beacon 300 furthermore computes a second CRC value over the entire advertising packet (or alternatively over the entire PDU for the advertising packet), including encrypted and non-encrypted data, and adds the second CRC value as last value to the PDU. It is to be understood that in an alternative embodiment, such a second CRC value could also be computed by mobile survey device 310 for the entire encrypted and non-encrypted radio image data, added to the final radio image data during assembly by mobile survey device 310 in action 405 and thus provided as additional value in action 406, while BLE beacon 300 may in this case receive the additional second CRC value as a part of the assembled radio image data in action 504 and store the value in the advertising data section in memory 302 along with the other received information. In this case, the second CRC value will not cover any information that is included by BLE beacon 300 in the advertising packets, like battery information, though.

FIG. 9 is a table illustrating the content of example advertising data for one of these advertising packets.

As indicated above, the AdvData field of the payload of each PDU may have a size of up to 31 bytes for arbitrary advertising data. In an example embodiment, the advertising data is assembled to comprise an un-encrypted part of 15 bytes and an encrypted part of 16 bytes.

The un-encrypted part comprises a preamble field of 1 byte and a MAC address field of 6 bytes. The preamble and the MAC address that are to be inserted into these fields for all advertising packets of BLE beacon 300 may be known to BLE beacon 300. Optionally, they may be stored along with the radio image data in the advertising section of memory 302 for facilitating the assembly of subsequent advertising packets. When installing the system, it may be taken care that all used MAC addresses of all BLE beacons are of the same generation. While the payload of an advertising PDU may comprises an AdvA field for a public or random device address as indicated above, the exploitation of this AdvA field may not be supported by all types of mobile devices that may wish to determine their own position. Therefore, some embodiments may provide that the MAC address is included only or in addition in the 31 byte AdvData field that is provided for the advertising data to ensure that a positioning application of any type of mobile device receiving radio signals of BLE beacon 300 may identify BLE beacon 300.

The un-encrypted part comprises a CRC field of 1 byte for the second CRC value that has been computed over the entire advertising packet (only excluding the CRC value itself).

The un-encrypted part comprises a CRC field of 1 byte for the second CRC value that has been computed in action 403 for the encrypted part of the radio image data by mobile survey device 310 and received at BLE component 300 in action 504.

The un-encrypted part comprises an image offset field of 3 bytes for the image offset that has been computed in action 402 by mobile survey device 310 and received at BLE component 300 in action 504.

The un-encrypted part comprises an image size field of 2 bytes for the image size that has been computed in action 402 by mobile survey device 310 and received at BLE component 300 in action 504.

The un-encrypted part comprises a page id field of 4 bits. It includes an indication that supports a distribution of encrypted data to a plurality of packets, in case the encrypted data comprises more than one block of encrypted data, that is, more than 16 bytes. It may be used for indicating for instance an ordinal number associated with each block, and optionally the total number of blocks containing encrypted data. The page id may be determined by BLE beacon 300 when assembling the packets based on the stored data, possibly making use of a total number of encrypted blocks indicated by mobile survey device 310.

The un-encrypted part comprises a battery information field of 4 bits for an indication of the current state of battery 307 of BLE beacon 300. The four bits may be used for instance for conveying a battery state of 25%, 50%, 75% or 100% of energy left. The respective state may be determined by processor 301, executing corresponding program code in memory 302, based on information from battery 307 and using always the next lowest percentage indication. Alternatively, some battery circuit containing battery 307 may be configured to indicate one of these four states to processor 301.

For the un-encrypted time stamp in the stored data, no separate field may be provided. The time stamp may be interleaved with image offset of image size. That is, e.g. the image offset and the time stamp could be used alternatingly in the image offset field of subsequent broadcast advertising packets.

The encrypted part comprises an encrypted block of 16 bytes as computed by mobile survey device 310 in action 404 and received at BLE component 300 in action 504. A first advertising packet comprises in encrypted form the origin latitude (4 bytes), the origin longitude (4 bytes), the origin floor id (1 byte), the DC component (1 byte) and the first 6 bytes of the AC components. If the AC components are defined by more than 6 bytes, a respective next advertising packet comprises the respective next 16 bytes of the AC components in encrypted form.

The un-encrypted part that is to be transmitted in an advertising packet with each of possibly different encrypted blocks may always be the same, except that image offset or image size may alternate with the time stamp (as indicated above), that the battery information may be updated for each advertising packet and that the page id may indicate the respective encrypted block that is currently used.

BLE beacon 300 broadcasts the generated advertising packets with the set frequency on the BLE advertising channels. (action 506) When the entire data in the advertising section of memory 302 has been transmitted, BLE beacon 300 continues with assembling and transmitting the next advertising packet(s) including the data in the advertising section of memory 302.

Figure 10:
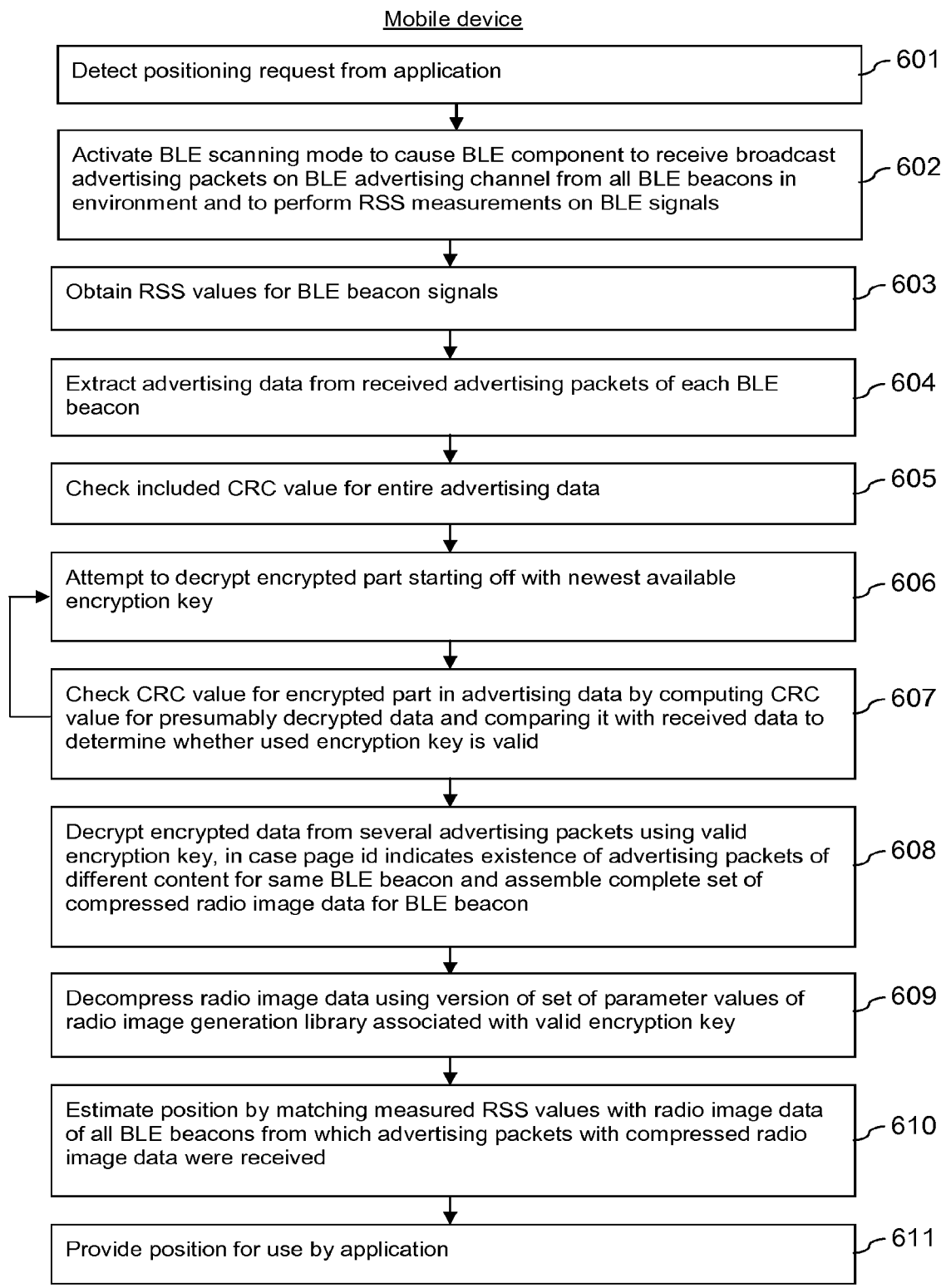
FIG. 10 is a flow chart illustrating an example embodiment of further operations in the system of FIG. 6.

FIG. 10 is a flow chart illustrating example operations at mobile device 320. Processor 321 and some of the program code stored in memory 322 may cause mobile survey device 320 to perform the presented actions when the program code is retrieved from memory 322 and executed by processor 321.

The purpose of the operations of FIG. 10 is to enable mobile device 320 to determine its own position without the need to download a large amount of assistance data via the Internet.

When some application of mobile device 320 requires the position of mobile device 320, a corresponding positioning request by this application may call up the positioning application of mobile device 320. (action 601)

The positioning application may activate a scanning mode of BLE component 326. (action 602) BLE component 326 thereupon scans the environment for radio signals on any BLE advertising channel and receives BLE advertising packets that are broadcast by BLE beacons 300 over any of the BLE advertising channels. The BLE component 326 also measures the received signal strength of the detected BLE radio signals.

Mobile device 320 thereby obtains RSS values for detected BLE beacon signals. (action 603)

In addition, mobile device 320 extracts the advertising data in the advertising PDU of each received advertising packet of each BLE beacon. (action 604) The PDU of each advertising packet comprises un-encrypted data and encrypted data.

The un-encrypted data comprises a MAC address, which functions as BLE beacon identifier. Advertising packets of each BLE beacon are processed in the same manner as described in the following with reference to actions 605 to 609.

The un-encrypted data further comprises a CRC value for the entire advertising data. If this CRC value has been computed by BLE beacon 300, the used CRC polynomial may be version independent. Mobile device 320 may check at first this CRC value by computing a CRC value over the entire advertising data using the same CRC polynomial and comparing it with the received CRC value. (action 605) This may have the effect that errors in the advertising data resulting from the transmission may be detected. Such errors may prevent a successful decryption of encrypted data even if the correct encryption key is used. If the received and the computed CRC values do not match, the advertising packet may thus be discarded.

If the received CRC value and the computed CRC values are determined to match, it may be assumed that no errors have been introduced to the received advertising data during transmission. Mobile device 320 may therefore proceed with attempting to decrypt the encrypted part of the advertising data. (action 606) Mobile device 320 may start off with the newest encryption key in the radio image generation library in memory 324.

The un-encrypted data comprises a further CRC value for the encrypted data only. Whether or not the decryption in action 606 was successful may be checked based on this received further CRC value. Mobile device 320 computes a further CRC value for the presumably decrypted data and compares this computed further CRC value with the received further CRC value. (action 607) The further CRC value is computed using a further CRC polynomial. This further CRC polynomial may be version dependent, and it may belong to a version of a set of values of parameters stored in the radio image generation library in memory 324 that is associated with the used encryption key.

If the received further CRC value is determined not to match the computed further CRC value, it may be assumed that the encrypted data was not successful and that the wrong encryption key was used for the decryption. Mobile device 320 continues in this case with action 606 using the next recent encryption key that is stored in the radio image generation library in memory 324.

If the received further CRC value is determined to match the computed further CRC value, it may be assumed that the decryption of the encrypted data was successful and that the used encryption key is valid for the advertising data of a particular BLE beacon 300.

In case several advertising packets with the same included MAC address are received which include different page id values, this indicates that the radio image data for a BLE beacon 300 is distributed to several advertising packets. Mobile device 320 may then decrypt encrypted data from an advertising packet with each page id value using the encryption key that has been found to be valid in action 607. The image offset and the image size from the un-encrypted part of one of the advertising packets may be combined with the decrypted data of all of these advertising packets—using an order of the decrypted data from different advertising packets that is indicated by the page id values—to obtain a complete set of compressed radio image data for a particular BLE beacon 300. (action 608) In case the page id indicates that all data is contained in a single packet, and a received and decrypted packet comprises a time stamp instead of an image offset or image size, mobile device 320 may extract the required information separately from the next advertising packet of the same BLE beacon 300.

Mobile device 320 may now decompress the assembled compressed radio image data. (action 609) It uses to this end various parameter values from the version of a set of values of parameters that is associated with the valid encryption key. These parameter values may be assumed to be the same that have previously been used for the compression of the data by mobile survey device 310.

The compressed radio image data may be for instance in the form of compressed DCT components of DCT transformed radio image data. In this case, the decompression may comprise decompressing at first compressed selected DCT components, in case selected DCT components have been compressed by mobile survey device 310. It may further comprise constructing a matrix, using the selected and decompressed DCT components as matrix elements and setting the DCT value of the other matrix elements to zero. The required size of the matrix may be taken from the received image size value. It may further comprise applying an inverse DCT to the matrix to obtain reconstructed radio image data.

Actions 605 to 609 are performed for each BLE beacon from which advertising packets are received. It may be noted that all or most beacons in a building may be assumed to have been configured with compressed and partially encrypted radio image data that has been generated using the same version of a set of values of parameters. However, BLE beacons may be replaced when the battery is empty or BLE beacons may be supplemented in case a positioning in some parts of the building is not satisfactory with the existing BLE beacons. Therefore, it may not simply be assumed that the same encryption key and the same version of a set of values of parameters were used for all BLE beacons of a building. The CRC check in action 607 may thus be performed for each BLE beacon. Still, if it is found for one of the BLE beacons that an older encryption key than the latest encryption key is the valid key, the first decryption attempt in action 607 for subsequent BLE beacons may optionally start off with this older encryption key.

Mobile device 320 estimates its position by matching the received signal strength values obtained in action 603 with the radio image data of all BLE beacons 300 for which compressed radio image data could be extracted from received advertising packets. (action 610)

The position may be estimated for instance by determining a geographical location which is represented by a respective grid point of the grid of a radio image of all BLE beacons 300 for which radio image data is available. The geographical location is further selected such that it results in the minimum total difference (determined e.g. as the sum of absolute values or as Euclidian distance) between the respective received signal strength value measured for the BLE beacons and the respective received signal strength value for these BLE beacons expected at the grid point of the grid of the radio image of the respective BLE beacon.

The position may also be estimated by calculating likelihood values by matching the received signal strength values of at least one BLE beacon with the radio image data of at least one BLE beacon for which radio image data has been obtained. The position of mobile device 320 may then be estimated, for example, as the location for which the likelihood that mobile device 320 is located at this location achieves the maximum value.

The estimated position may then be provided for use by the application requesting the position. (action 611) The application may present the estimated position for instance to a user of mobile device 320 via display 328.

In case mobile device 320 is a mobile survey device, like mobile survey device 310, the estimated position may also be used to check the quality of the system. This may include checking whether there are sufficient BLE beacons in the building and/or checking whether positioning results degrade with a new version of a set of values of parameters that has been used for a particular building. Such a mobile survey device may also evaluate the battery state in the received advertising data of each BLE beacon to obtain a decision criterion whether or not a particular BLE beacon or the battery of a particular BLE beacon may have to be replaced in the near future.

It is to be understood that received radio image data of a particular BLE beacon 300 does not have to be processed in line with actions 605 to 609 each time a new scan is performed while mobile device 320 is moving in a limited area in which signals of the same BLE beacons 300 may be observed repeatedly. A small amount of decompressed radio image data may be stored in memory 324 and be reused even if memory 324 of mobile device 320 is fairly small. Decompressed radio image data may be stored for instance for a predetermined period of time. Alternatively, it would be possible, for instance, to keep decompressed radio image data for a predetermined number of BLE beacons 300 that have been detected most recently by mobile device 320.

Figure 11:
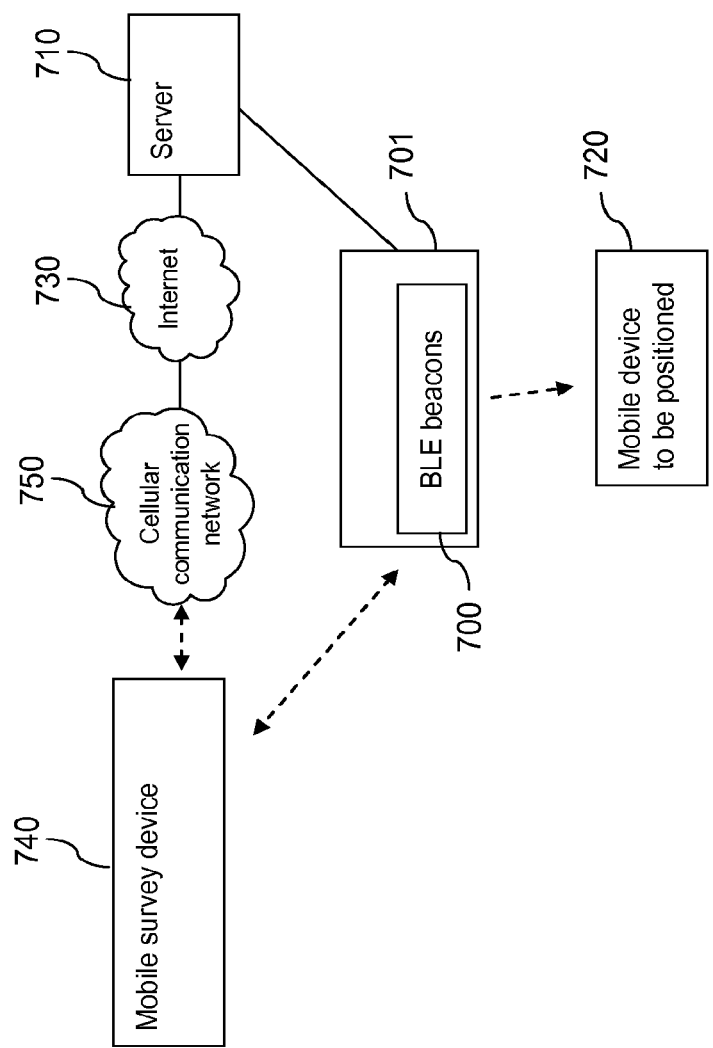
FIG. 11 is a schematic block diagram of a further example embodiment of a system comprising an example embodiment of an apparatus according to the first aspect, an example embodiment of an apparatus according to the second aspect and an example embodiment of an apparatus according to the third aspect.

FIG. 11 is a schematic block diagram of another example embodiment of a system supporting a self-contained positioning system, the system making use of example embodiments of the three aspects of the invention.

The system comprises a plurality of BLE beacons 700, a server 710 and mobile devices 720 that may desire to determine their own position. Each of the BLE beacons 700 may be integrated in a device 701 that comprises a further communication interface. Server 710 may be a server that is provided for a specific building, and it may be enabled to access devices 701 for instance via a local area network (LAN) or a WLAN of the building. Alternatively, server 710 may be a general service providing server and may be enabled to access devices 701 via the Internet 730.

The system may comprise in addition at least one mobile survey device 740. Server 710 may be enabled to communicate with other devices via the Internet 730. Mobile survey device 740 may be enabled to communicate with servers that are accessible via the Internet 730 using a cellular communication network 750 connected to the Internet 730. Cellular communication network 750 may be any kind of cellular communication network, like a Global System for Mobile Communications (GSM), a CDMA2000, a Universal Mobile Telecommunications System (UMTS), or a long term evolution (LTE) based communication network. It is to be understood that alternatively or in addition, mobile survey device 740 may be enabled to use a wireless local area network (WLAN) for communicating with server 710 via the Internet 730.

Operations in the system of FIG. 11 may be basically the same as operations in the system of FIG. 6. Only the tasks of mobile survey device 310 of FIG. 6 as illustrated in FIG. 7 are split up in this case between mobile survey device 740 and server 710. For example, action 401 may be performed by mobile survey device 740, which may then transmit the collected data to server 710. Server 710 may then perform actions 402 to 406. The configuration of BLE beacons 700 may then be caused by server 710 via device 701 comprising the respective BLE beacon 700 using any other communication channel than Bluetooth which is supported by both server 710 and device 701. Accordingly, actions 502 and 503 of FIG. 9 may be omitted.

It is to be understood that the presented example systems, apparatuses and operations may be varied in many ways. The operations may be varied for instance by modifying actions, by omitting actions and/or by adding actions. In addition, the order of actions may be modified.

For example, in an alternative embodiment, mobile survey device may compute in action 403 a separate CRC value for each data block of a selected part of the compressed image data that is encoded in a block encoding. In this case, several CRC values for encrypted data may be provided by mobile survey device 310 to BLE beacon 300 in action 406. Each advertising packet transmitted by BLE beacon 300 broadcast in action 506 may then comprise a CRC value specifically for the contained encrypted data block.

For example, in an alternative embodiment, the positioning support devices may include other transmitters than BLE beacons, for example regular Bluetooth transmitters or ultrasound transmitters, etc.

For example, in an alternative embodiment, the location of measurement may be determined by other means than user input or GNSS based positioning, for instance using a WLAN based positioning.

For example, in an alternative embodiment, the system may rely largely on BLE beacons that are already available at a localization site. Only as far as the BLE beacons are distributed too sparsely, additional BLE beacons may be used for supplementing the existing infrastructure.

Summarized, certain embodiments of the invention provide for a self-contained positioning system which may not require any Internet connectivity for positioning. In certain embodiments of the invention the whole system may be set up with a smart phone and few tags, like BLE beacons, only. Certain embodiments of the invention may be suited for a large number of users of the provided positioning service, as these users only have to rely on broadcast advertised data and thus on no individual connections. Certain embodiments of the invention using radio image data for the actual positioning enable a robust solution, since a radio image may be suited to capture the radio environment very effectively. Certain embodiments of the invention enable a positioning of mobile devices with very small memory, like IoT devices. Certain embodiments of the invention enable a positioning of smart phones or other mobile devices without requiring any proprietary hardware. Certain embodiments of the invention enable a control of a versioning of the positioning support devices and an assurance of a successful transmission of radio image data without sparing bits to control the version of employed parameter values. Certain embodiments of the invention enable positioning support devices to save power, as the version of parameter values used for generating radio image data for a positioning support device may not have to be transferred in addition in each transmission of a positioning support device.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 12:
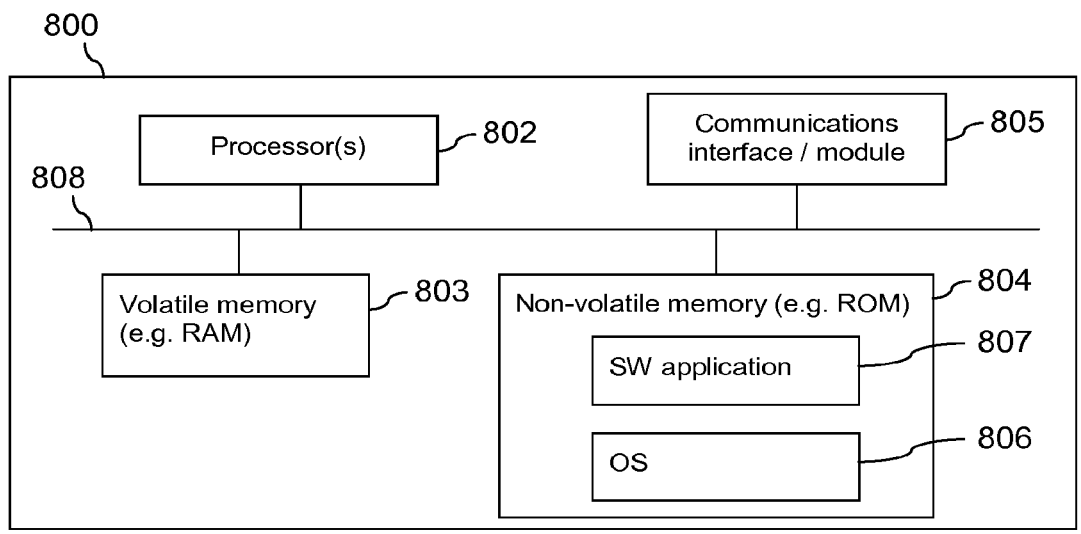
FIG. 12 is a schematic block diagram of an example embodiment of an apparatus.
Figure 13:
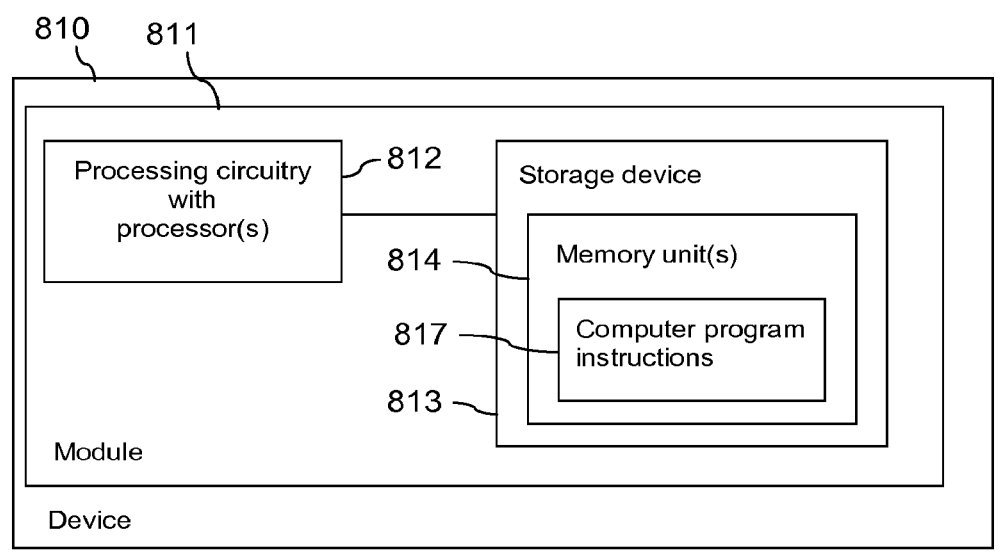
FIG. 13 is a schematic block diagram of an example embodiment of an apparatus.

Example embodiments using at least one processor and at least one memory as a non-transitory data medium are shown in FIGS. 12 and 13.

FIG. 12 is a schematic block diagram of a device 800. Device 800 includes a processor 802. Processor 802 is connected to a volatile memory 803, such as a RAM, by a bus 808. Bus 808 also connects processor 802 and RAM 803 to a non-volatile memory 804, such as a ROM. A communications interface or module 805 is coupled to bus 808, and thus also to processor 802 and memories 803, 804. Within ROM 804 is stored a software (SW) application 807. Software application 807 may be a positioning application, although it may take some other form as well. An operating system (OS) 806 also is stored in ROM 804.

FIG. 13 is a schematic block diagram of a device 810. Device 810 may take any suitable form. Generally speaking, device 810 may comprise processing circuitry 812, including one or more processors, and a storage device 813 comprising a single memory unit or a plurality of memory units 814. Storage device 813 may store computer program instructions 817 that, when loaded into processing circuitry 812, control the operation of device 810. Generally speaking, also a module 811 of device 810 may comprise processing circuitry 812, including one or more processors, and storage device 813 comprising a single memory unit or a plurality of memory units 814. Storage device 813 may store computer program instructions 817 that, when loaded into processing circuitry 812, control the operation of module 811.

The software application 807 of FIG. 12 and the computer program instructions 817 of FIG. 13, respectively, may correspond e.g. to the computer program code in any of memories 102, 202, 302, 312 or 322, respectively.

Figure 14:
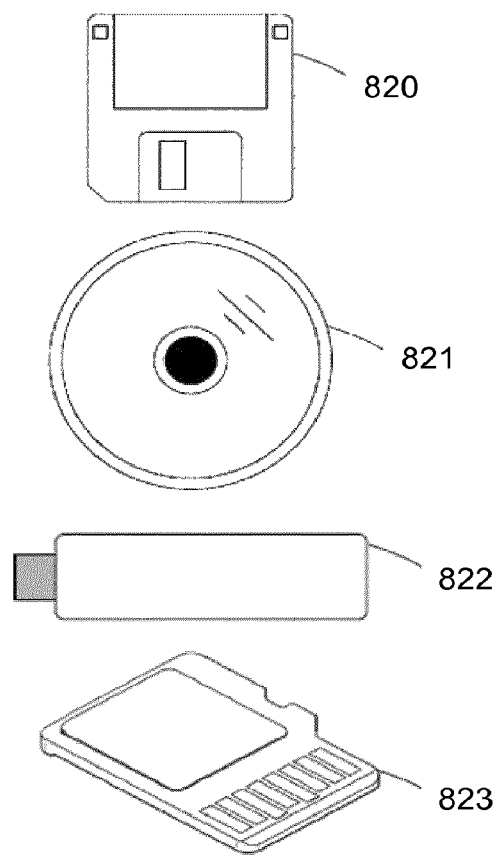
FIG. 14 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 14, which presents, from top to bottom, schematic diagrams of a magnetic disc storage 820, of an optical disc storage 821, of a semiconductor memory circuit device storage 822 and of a Micro-SD semiconductor memory card storage 823.

The functions illustrated by processor 101 in combination with memory 102, or processor 321 in combination with memory 322, or component 323 can also be viewed as means for extracting from radio signals, transmitted by a positioning support device and received by a mobile device, data enabling a determination of characteristics of radio signals transmitted by the positioning support device, the characteristics expected to be observable at different locations, wherein the data is at least partially encrypted using an encryption key that is associated with a particular version of a set of values of parameters that was used in assembling the data; means for attempting to decrypt the at least partially encrypted data using at least one encryption key that is accessible to the apparatus; means for determining whether the decryption with a used encryption key was successful; and means for selecting a version of a set of values of parameters that is associated with the encryption key if it is determined that the decryption was successful.

The program codes in memory 102—as far as provided for the first aspect—and memory 322 can also be viewed as comprising such means in the form of functional modules.

The functions illustrated by processor 101 in combination with memory 102, or processor 311 in combination with memory 312, or component 313 can also be viewed as means for obtaining characteristics of radio signals, the radio signals transmitted by a positioning support device and the characteristics of radio signals measured by at least one mobile device at each of a plurality of locations and obtaining indications of the locations of measurement; means for making use of a predetermined version of a set of values of parameters for assembling, based on the obtained characteristics of radio signals and the obtained indications of the locations of measurement, data enabling a determination of characteristics of radio signals transmitted by the positioning support device, the characteristics expected to be observable at different locations; means for encrypting the assembled data at least partially using an encryption key that is associated with the predetermined version of the used set of values of parameters; and means for causing the positioning support device to store the at least partially encrypted data as a basis for a repeated and automatic transmission of the data by the positioning support device to enable mobile devices receiving the data to determine their positions.

The program codes in memory 102—as far as provided for the second aspect—and memory 312 can also be viewed as comprising such means in the form of functional modules.

The functions illustrated by processor 201 in combination with memory 202, or processor 301 in combination with memory 302, or component 303 can also be viewed as means for holding available, at a positioning support device, stored data which enables a determination of characteristics of radio signals transmitted by the positioning support device, the characteristics being expected to be observable at different locations, wherein the stored data has been at least partially encrypted using an encryption key that is associated with a particular version of a set of values of parameters used for assembling the data; and means for automatically and repeatedly transmitting, by the positioning support device, the stored data to enable mobile devices receiving the data and having access to the encryption key and the particular version of the set of values of parameters to determine their position based on the data.

FIGS. 2, 3, 7, 8 and 10 may also be understood to represent example functional blocks of computer program codes supporting a positioning of a mobile device by the mobile device.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

That which is claimed is:

1. A method comprising:
   obtaining (i) characteristics of radio signals, the radio signals transmitted by a positioning support device and the characteristics of radio signals measured by at least one mobile device at each of a plurality of locations and (ii) indications of the locations of measurement by the at least one mobile device;
   making use of a predetermined version of a set of values of parameters for assembling, based on the obtained characteristics of radio signals as measured by the at least one mobile device and the obtained indications of the locations of measurement by the at least one mobile device, data enabling a determination of characteristics of radio signals transmitted by the positioning support device, the characteristics expected to be observable at different locations;
   encrypting the assembled data at least partially using an encryption key that is associated with the predetermined version of the used set of values of parameters, wherein encryption of the assembled data is performed by the at least one mobile device; and causing the positioning support device to store the at least partially encrypted data that has been encrypted by the at least one mobile device as a basis for a repeated and automatic transmission of the data by the positioning support device to enable mobile devices receiving the data to determine their positions.

2. The method according to claim 1, wherein the predetermined version of a set of values of parameters is one of a plurality of versions of the set of values of parameters accessible to the at least one mobile device and wherein the encryption key that is associated with the predetermined version of the used set of values of parameters is one of a plurality of encryption keys accessible to the at least one mobile device, each of the plurality of encryption keys being associated with another one of the plurality of versions of the set of values of parameters.

3. The method according to claim 1, wherein assembling the data comprises computing an error detecting code value at least for a part of the assembled data that is to be encrypted.

4. The method according to claim 3, wherein the at least partially encrypted data comprises the error detecting code value.

5. The method according to claim 1, wherein the at least partially encrypted data on a radio image comprises at least one of:
a non-encrypted error detection code value;
a non-encrypted error detection code value in the form of a cyclic redundancy check value;
a non-encrypted error detection code value for the encrypted part of the at least partially encrypted data before encryption;
a non-encrypted error detection code value for the encrypted part of the extracted data and a non-encrypted part of the extracted data;
a non-encrypted identification of the positioning support device;
a non-encrypted indication of an image offset compared to an origin;
a non-encrypted indication of an image size;
an encrypted indication of an origin;
encrypted selected frequency values of a frequency transform of a radio image representing the characteristics of radio signals expected to be observable at different locations; or
encrypted selected and compressed frequency values of a frequency transform of a radio image representing the characteristics of radio signals expected to be observable at different locations.

6. The method according to claim 1, wherein making use of the predetermined version of the set of values of parameters for assembling the data comprises making use of the predetermined version of the set of values of parameters for compressing the data.

7. The method according to claim 1, wherein the characteristics of the radio signals measured by the at least one mobile device comprise one or more of a received signal strength, a timing advance or a round trip time of radio signals transmitted by the positioning support device and measured by the at least one mobile device.

8. The method according to claim 1, wherein the radio signals having the characteristics measured by the at least one mobile device also comprise a non-encrypted identification of the positioning support device that transmitted the radio signals.

9. An apparatus comprising at least one processor and at least one memory including computer program code, the at least one memory and the computer program code configured to, with the at least one processor, cause an apparatus at least to perform:

obtain: (i) characteristics of radio signals, the radio signals transmitted by a positioning support device and the characteristics of radio signals measured by at least one mobile device at each of a plurality of locations and (ii) indications of the locations of measurement by the at least one mobile device;

make use of a predetermined version of a set of values of parameters for assembling, based on the obtained characteristics of radio signals as measured by the at least one mobile device and the obtained indications of the locations of measurement by the at least one mobile device, data enabling a determination of characteristics of radio signals transmitted by the positioning support device, the characteristics expected to be observable at different locations;

encrypt the assembled data at least partially using an encryption key that is associated with the predetermined version of the used set of values of parameters, wherein encryption of the assembled data is performed by the apparatus of the at least one mobile device; and cause the positioning support device to store the at least partially encrypted data that has been encrypted by the apparatus of the at least one mobile device as a basis for a repeated and automatic transmission of the data by the positioning support device to enable mobile devices receiving the data to determine their positions.

10. The apparatus according to claim 9, wherein the predetermined version of a set of values of parameters is one of a plurality of versions of the set of values of parameters accessible to the apparatus and wherein the encryption key that is associated with the predetermined version of the used set of values of parameters is one of a plurality of encryption keys accessible to the apparatus, each of the plurality of encryption keys being associated with another one of the plurality of versions of the set of values of parameters.

11. The apparatus according to claim 9, wherein assembling the data comprises computing an error detecting code value at least for a part of the assembled data that is to be encrypted.

12. The apparatus according to claim 11, wherein the at least partially encrypted data comprises the error detecting code value.

13. The apparatus according to claim 9, wherein the at least partially encrypted data on a radio image comprises at least one of:
a non-encrypted error detection code value;
a non-encrypted error detection code value in the form of a cyclic redundancy check value;
a non-encrypted error detection code value for the encrypted part of the at least partially encrypted data before encryption;
a non-encrypted error detection code value for the encrypted part of the extracted data and a non-encrypted part of the extracted data;
a non-encrypted identification of the positioning support device;
a non-encrypted indication of an image offset compared to an origin;

a non-encrypted indication of an image size;
an encrypted indication of an origin;
encrypted selected frequency values of a frequency transform of a radio image representing the characteristics of radio signals expected to be observable at different locations; or
encrypted selected and compressed frequency values of a frequency transform of a radio image representing the characteristics of radio signals expected to be observable at different locations.

14. The apparatus according to claim 9, wherein the apparatus is one of:
a chip;
a module for a server;
a server;
a module for a mobile device; or
a mobile device.

15. A non-transitory computer readable storage medium in which computer program code is stored, wherein the computer program code is configured, upon execution, to cause an apparatus to:
obtain (i) characteristics of radio signals, the radio signals transmitted by a positioning support device and the characteristics of radio signals measured by at least one mobile device at each of a plurality of locations and (ii) indications of the locations of measurement by the at least one mobile device;
make use of a predetermined version of a set of values of parameters for assembling, based on the obtained characteristics of radio signals as measured by the at least one mobile device and the obtained indications of the locations of measurement by the at least one mobile device, data enabling a determination of characteristics of radio signals transmitted by the positioning support device, the characteristics expected to be observable at different locations;
encrypt the assembled data at least partially using an encryption key that is associated with the predetermined version of the used set of values of parameters, wherein encryption of the assembled data is performed by the apparatus of the at least one mobile device; and
cause the positioning support device to store the at least partially encrypted data that has been encrypted by the apparatus of the at least one mobile device as a basis for a repeated and automatic transmission of the data by the positioning support device to enable mobile devices receiving the data to determine their positions.

16. The computer readable storage medium according to claim 15, wherein the predetermined version of a set of values of parameters is one of a plurality of versions of the set of values of parameters accessible to the apparatus and wherein the encryption key that is associated with the predetermined version of the used set of values of parameters is one of a plurality of encryption keys accessible to the apparatus, each of the plurality of encryption keys being associated with another one of the plurality of versions of the set of values of parameters.

17. The computer readable storage medium according to claim 15, wherein the computer program code configured to assemble the data comprises computer program code configured to compute an error detecting code value at least for a part of the assembled data that is to be encrypted.

18. The computer readable storage medium according to claim 17, wherein the at least partially encrypted data comprises the error detecting code value.

19. The computer readable storage medium according to claim 15, wherein the computer program code configured to encrypt the assembled data at least partially comprises using a block encryption.

20. The computer readable storage medium according to claim 15, wherein the at least partially encrypted data on a radio image comprises at least one of:
a non-encrypted error detection code value;
a non-encrypted error detection code value in the form of a cyclic redundancy check value;
a non-encrypted error detection code value for the encrypted part of the at least partially encrypted data before encryption;
a non-encrypted error detection code value for the encrypted part of the extracted data and a non-encrypted part of the extracted data;
a non-encrypted identification of the positioning support device;
a non-encrypted indication of an image offset compared to an origin;
a non-encrypted indication of an image size;
an encrypted indication of an origin;
encrypted selected frequency values of a frequency transform of a radio image representing the characteristics of radio signals expected to be observable at different locations; or
encrypted selected and compressed frequency values of a frequency transform of a radio image representing the characteristics of radio signals expected to be observable at different locations.

* * * * *